US012732289B2

(12) United States Patent
Rydén et al.

(10) Patent No.: US 12,732,289 B2
(45) Date of Patent: Sep. 8, 2026

(54) COMMUNICATION DEVICE PREDICTED FUTURE INTERFERENCE INFORMATION

(71) Applicant: Telefonaktiebolaget LM Ericsson (publ), Stockholm (SE)

(72) Inventors: Henrik Rydén, Stockholm (SE); Luca Lunardi, Genoa (IT); Angelo Centonza, Granada (ES); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 544 days.

(21) Appl. No.: 18/030,002

(22) PCT Filed: Oct. 21, 2021

(86) PCT No.: PCT/EP2021/079233
§ 371 (c)(1),
(2) Date: Apr. 3, 2023

(87) PCT Pub. No.: WO2022/084457
PCT Pub. Date: Apr. 28, 2022

(65) Prior Publication Data

US 2023/0370181 A1 Nov. 16, 2023

Related U.S. Application Data

(60) Provisional application No. 63/094,837, filed on Oct. 21, 2020.

(51) Int. Cl.
*G06N 20/00* (2019.01)
*H04B 17/336* (2015.01)
*H04W 24/02* (2009.01)

(52) U.S. Cl.
CPC .......... *H04B 17/336* (2015.01); *H04W 24/02* (2013.01)

(58) Field of Classification Search
None
See application file for complete search history.

(56) References Cited

U.S. PATENT DOCUMENTS

2015/0237517 A1* 8/2015 Hwang .................... H04L 1/06 370/252
2020/0235833 A1 7/2020 Zhu et al.

FOREIGN PATENT DOCUMENTS

WO 2020/163096 A1 8/2020

OTHER PUBLICATIONS

International Search Report and Written Opinion of the International Searching Authority, PCT/EP2021/079233, mailed Feb. 8, 2022, 9 pages.

(Continued)

*Primary Examiner* — Minh Trang T Nguyen
(74) *Attorney, Agent, or Firm* — Sage Patent Group

(57) ABSTRACT

A method performed by a network node for a telecommunications network for handling interference variations for a communication device is provided. The method includes configuring the communication device to measure on a set of resources and to build a machine learning, ML, model to predict a future interference measurement from the set of resources. The method further includes signaling a request to the communication device to provide a prediction of the future interference measurement on the set of resources. The method further includes receiving, from the communication device, at least one prediction of future interference on the set of resources. The method further includes changing a network configuration for the communication device based on the received at least one prediction of future interference.

12 Claims, 21 Drawing Sheets

(56) References Cited

OTHER PUBLICATIONS

Bastidas-Puga, Enrique R et al., “Handover based on predictive approach of signal-to-interference-plus-noise ’atio for heterogeneous cellular networks,” IET Commun., 2019, vol. 13, Issue 6, pp. 672-678.

Xu, Zhaoqi et al., “Predictive Resource Allocation with Interference Coordination by Deep Learning, ” 2019 11th International Conference on Wire Communications and Signal Processing (WCSP), IEEE, Oct. 23, 2019, 6 pages.

Communication pursuant to Article 94(3) mailed Mar. 21, 2025 for European Patent Application No. 21798364.2, 6 pages.

* cited by examiner

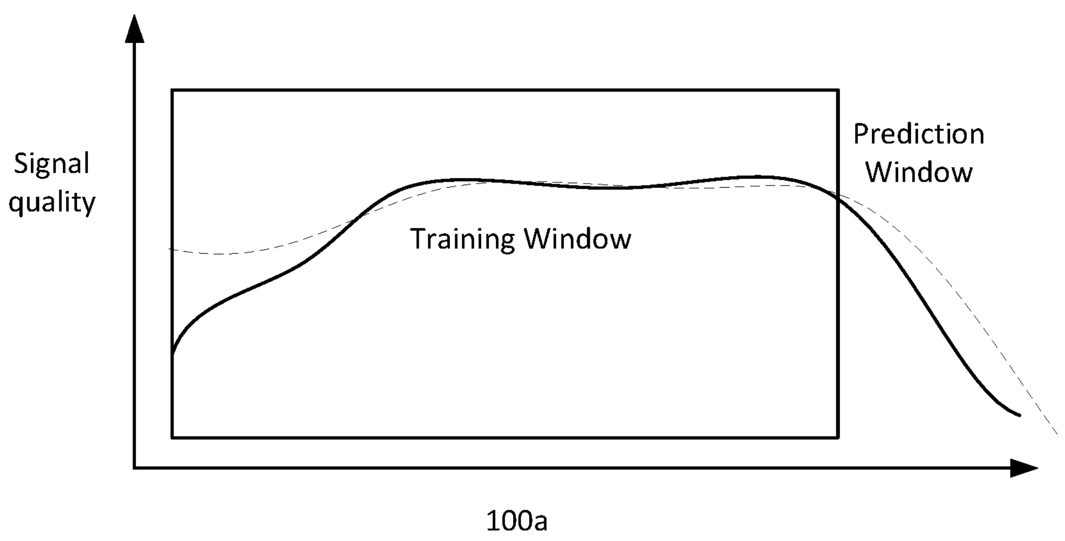
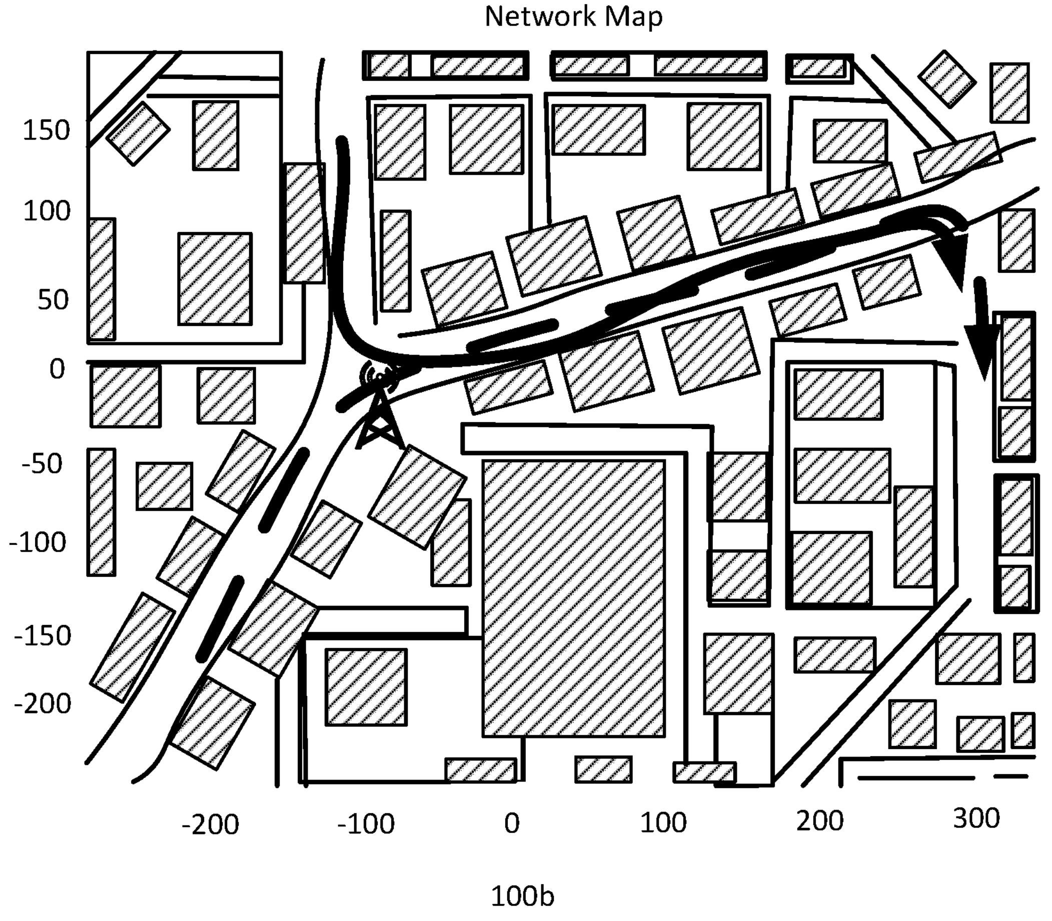
Figure 1

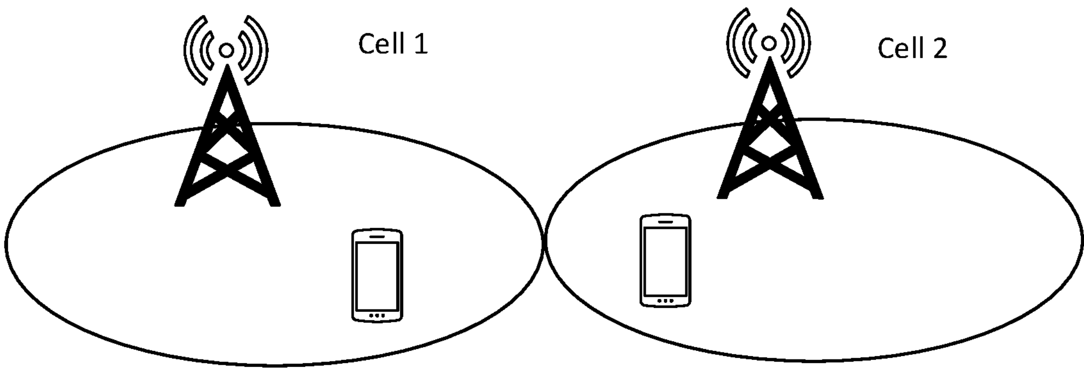
Enclosed Area Includes Cell 2 Measurements
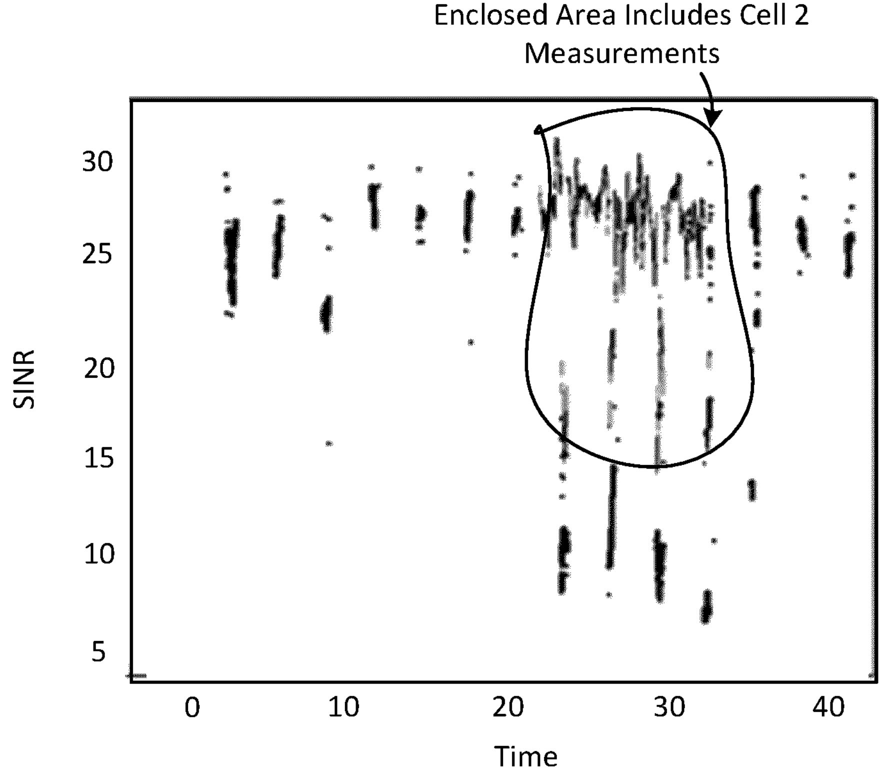
Figure 2

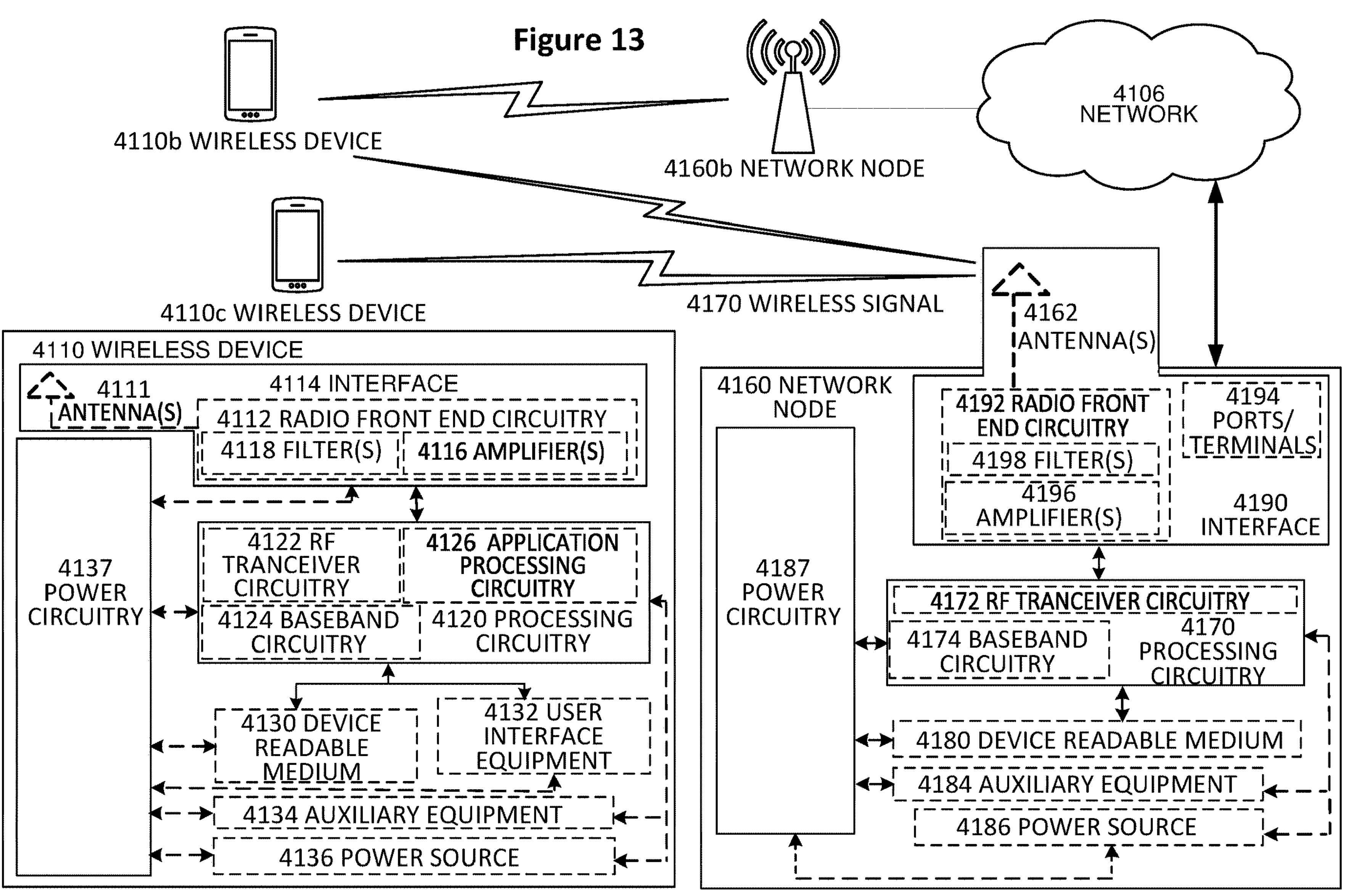
Figure 13
4110b WIRELESS DEVICE
4160b NETWORK NODE
4106 NETWORK
4110c WIRELESS DEVICE
4170 WIRELESS SIGNAL
4162 ANTENNA(S)
4110 WIRELESS DEVICE
4111 ANTENNA(S)
4114 INTERFACE
4112 RADIO FRONT END CIRCUITRY
4118 FILTER(S)
4116 AMPLIFIER(S)
4137 POWER CIRCUITRY
4122 RF TRANCEIVER CIRCUITRY
4126 APPLICATION PROCESSING CIRCUITRY
4124 BASEBAND CIRCUITRY
4120 PROCESSING CIRCUITRY
4130 DEVICE READABLE MEDIUM
4132 USER INTERFACE EQUIPMENT
4134 AUXILIARY EQUIPMENT
4136 POWER SOURCE
4160 NETWORK NODE
4192 RADIO FRONT END CIRCUITRY
4198 FILTER(S)
4196 AMPLIFIER(S)
4194 PORTS/ TERMINALS
4190 INTERFACE
4187 POWER CIRCUITRY
4172 RF TRANCEIVER CIRCUITRY
4174 BASEBAND CIRCUITRY
4170 PROCESSING CIRCUITRY
4180 DEVICE READABLE MEDIUM
4184 AUXILIARY EQUIPMENT
4186 POWER SOURCE

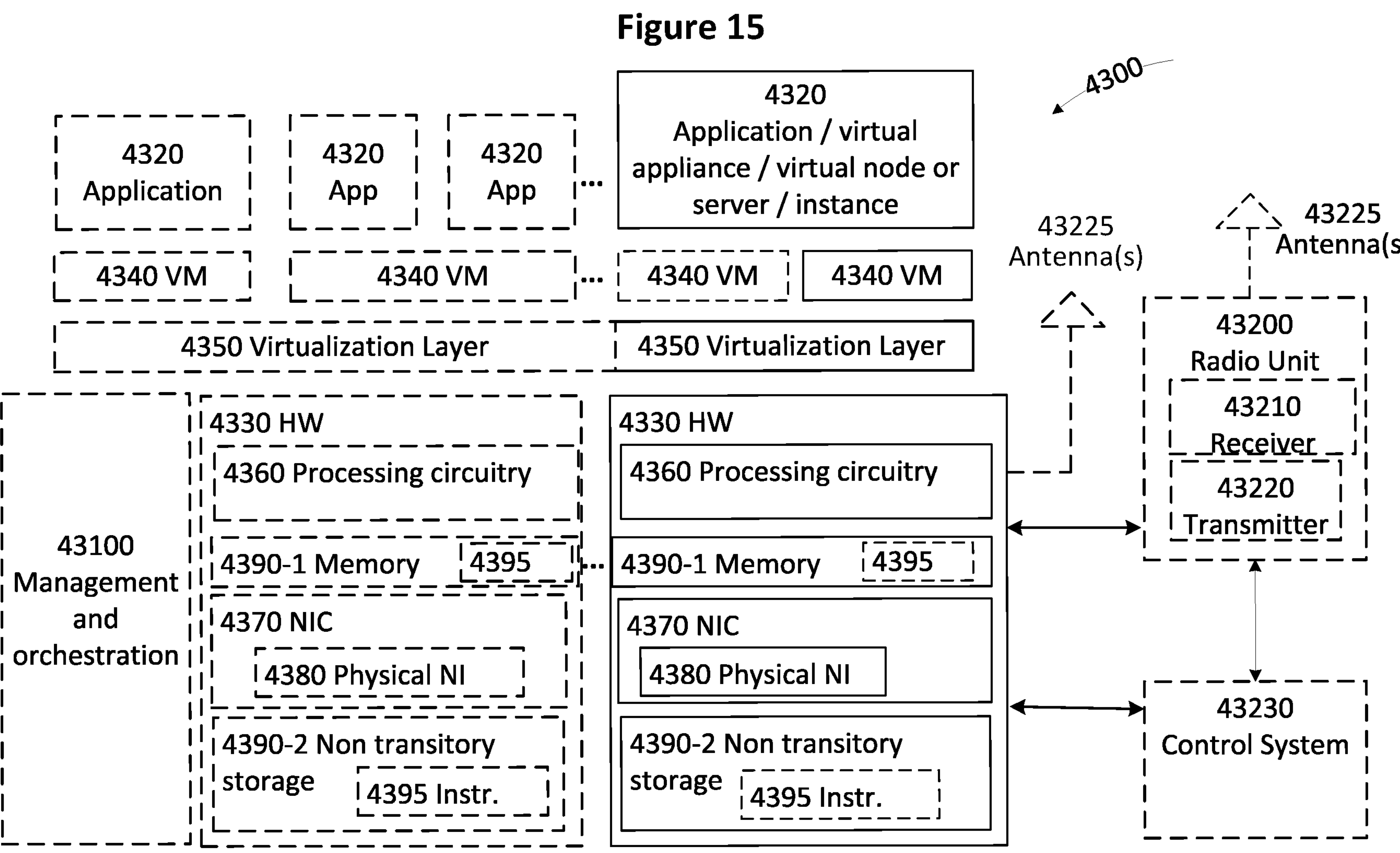
Figure 15
4300
4320 Application
4320 App
4320 App
4320 Application / virtual appliance / virtual node or server / instance
4340 VM
4340 VM
4340 VM
4340 VM
4350 Virtualization Layer
4350 Virtualization Layer
43100 Management and orchestration
4330 HW
4360 Processing circuitry
4390-1 Memory
4395
4370 NIC
4380 Physical NI
4390-2 Non transitory storage
4395 Instr.
4330 HW
4360 Processing circuitry
4390-1 Memory
4395
4370 NIC
4380 Physical NI
4390-2 Non transitory storage
4395 Instr.
43225 Antenna(s)
43225 Antenna(s)
43200 Radio Unit
43210 Receiver
43220 Transmitter
43230 Control System

COMMUNICATION DEVICE PREDICTED FUTURE INTERFERENCE INFORMATION

CROSS REFERENCE TO RELATED APPLICATIONS

This application is a 35 U.S.C. § 371 national stage application of PCT International Application No. PCT/EP2021/079233 filed on Oct. 21, 2021, which in turn claims domestic priority to U.S. Provisional Patent Application No. 63/094,837, filed on Oct. 21, 2020, the disclosures and content of which are incorporated by reference herein in their entirety.

The present disclosure relates generally to methods for communication device predicted interference variations and network node handling of received predicted interference variations for a telecommunications network, and related methods and apparatuses.

BACKGROUND

Periodic interference in a telecommunication network may be experienced. In some situations, a UE may experience predictable traffic in a case where an interferer has a certain traffic pattern, e.g., such as video-call streaming or periodic sensor data transmissions.

Exemplary traffic in two cells is illustrated in FIG. 2. In the example of FIG. 2, cell 1 has one connected UE with periodic video streaming traffic starting at t=3 seconds, and cell 2 has a file transfer download to a UE starting at t=23 seconds. FIG. 2 illustrates how the signal to interference and noise ratio (SINR) for the video-streaming UE and the file-downloading UE varies depending on whether their traffic is colliding.

Another scenario when interference can be very heavy in some subframes is in a time division duplex (TDD) operation when the TDD settings are different for neighboring nodes, e.g., when using dynamic TDD. An example is illustrated in FIG. 3, where two nodes use different TDD settings. A second UE (UE2) is connected to a second base station (BS2), while a first UE (UE1) is connected to a first base station (BS1). The selected TDD configurations and location of the UEs imply that the uplink transmission from UE2 can cause heavy interference on the downlink for UE1 in subframe 5.

SUMMARY

In various embodiments, a method performed by a network node for a telecommunications network for handling interference variations for a communication device is provided. The method includes configuring the communication device to measure on a set of resources and to build a machine learning, ML, model to predict a future interference measurement from the set of resources. The method further includes signaling a request to the communication device to provide a prediction of the future interference measurement on the set of resources. The method further includes receiving, from the communication device, at least one prediction of future interference on the set of resources. The method further includes changing a network configuration for the communication device based on the received at least one prediction of future interference.

In various embodiments, a network node in a telecommunications network is provided. The network node includes at least one processor, and at least one memory connected to the at least one processor and storing program code that is executed by the at least one processor to perform operations. The operations include configure the communication device to measure on a set of resources and to build a machine learning, ML, model to predict a future interference measurement from the set of resources. The operations further include signal a request to the communication device to provide a prediction of the future interference measurement on the set of resources. The operations further include receive, from the communication device, at least one prediction of future interference on the set of resources. The operations further include change a network configuration for the communication device based on the received at least one prediction of future interference.

In various embodiments, a network node in a telecommunications network is provided that is adapted to perform operations. The operations include configure the communication device to measure on a set of resources and to build a machine learning, ML, model to predict a future interference measurement from the set of resources. The operations further include signal a request to the communication device to provide a prediction of the future interference measurement on the set of resources. The operations further include receive, from the communication device, at least one prediction of future interference on the set of resources. The operations further include change a network configuration for the communication device based on the received at least one prediction of future interference.

In various embodiments, a computer program including program code to be executed by processing circuitry of a network node for a telecommunications network is provided. Execution of the program code causes the network node to perform operations including configure the communication device to measure on a set of resources and to build a machine learning, ML, model to predict a future interference measurement from the set of resources. The operations further include signal a request to the communication device to provide a prediction of the future interference measurement on the set of resources. The operations further include receive, from the communication device, at least one prediction of future interference on the set of resources. The operations further include change a network configuration for the communication device based on the received at least one prediction of future interference.

In various embodiments, a computer program product including a non-transitory storage medium including program code to be executed by processing circuitry of a network node for a telecommunications network is provided. Execution of the program code causes the network node to perform operations including configure the communication device to measure on a set of resources and to build a machine learning, ML, model to predict a future interference measurement from the set of resources. The operations further include signal a request to the communication device to provide a prediction of the future interference measurement on the set of resources. The operations further include receive, from the communication device, at least one prediction of future interference on the set of resources. The operations further include change a network configuration for the communication device based on the received at least one prediction of future interference.

In various embodiments, a method performed by a communication device in a telecommunications network for predicting interference variations is provided. The method includes receiving, from a network node, a request to build a machine learning, ML, model of predictions of future interference based on a set of resources. The method further includes predicting, at the communication device, at least one prediction of future interference based on a historical interference measurement. The historical interference measurement includes an indication of the interference experienced by the communication device. The method further includes transmitting the at least one prediction of future interference to the network node.

In various embodiments, a communication device in a telecommunications network is provided. The communication device includes at least one processor, and at least one memory connected to the at least one processor and storing program code that is executed by the at least one processor to perform operations including receive, from a network node, a request to build a machine learning, ML, model of predictions of future interference based on a set of resources. The operations further include predict, at the communication device, at least one prediction of future interference based on a historical interference measurement, wherein the historical interference measurement comprises an indication of the interference experienced by the communication device. The operations further include transmit the at least one prediction of future interference to the network node.

In various embodiments, a communication device in a telecommunications network is provided that is adapted to perform operations. The operations include receive, from a network node, a request to build a machine learning, ML, model of predictions of future interference based on a set of resources. The operations further include predict, at the communication device, at least one prediction of future interference based on a historical interference measurement, wherein the historical interference measurement comprises an indication of the interference experienced by the communication device. The operations further include transmit the at least one prediction of future interference to the network node.

In various embodiments, a computer program including program code to be executed by processing circuitry of a communication device in a telecommunications network is provided. Execution of the program code causes the communication device to perform operations including receive, from a network node, a request to build a machine learning, ML, model of predictions of future interference based on a set of resources. The operations further include predict, at the communication device, at least one prediction of future interference based on a historical interference measurement, wherein the historical interference measurement comprises an indication of the interference experienced by the communication device. The operations further include transmit the at least one prediction of future interference to the network node.

In various embodiments, a computer program product including a non-transitory storage medium including program code to be executed by processing circuitry of a communication device in a telecommunications network is provided. Execution of the program code causes the communication device to perform operations including receive, from a network node, a request to build a machine learning, ML, model of predictions of future interference based on a set of resources. The operations further include predict, at the communication device, at least one prediction of future interference based on a historical interference measurement, wherein the historical interference measurement comprises an indication of the interference experienced by the communication device. The operations further include transmit the at least one prediction of future interference to the network node.

Potential advantages of disclosed embodiments may include that by building and utilizing predictions of interference from an artificial intelligence (AD/machine learning (ML) model of a communication device based on historically experienced interference of the communication device, improved radio resource management operation may be achieved, such as link-adaptation. Additional potential advantages provided by various embodiments of the present disclosure may include signaling enabling the communication device serving cell to signal traffic information to the communication device. Additionally, in various embodiments, a network node (e.g., a gNodeB) can receive predicted interference caused by beamforming configurations in neighboring cells, which is another potential advantage of the present disclosure because such information otherwise may be hard to retrieve/estimate using only load information signaling from the UE neighboring cells.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a plot illustrating signal quality in a prediction window for two UEs on similar paths (100*a*) and a schematic diagram illustrating the two UEs moving on similar paths (100*b*);

FIG. 2 is a schematic diagram illustrating two cells (Cell 1 and Cell 2) and a plot illustrating signal to interference and noise ratio (SINR) versus time for two UEs (a UE connected in Cell 1 and a UE connected in Cell 2, respectively);

FIG. 13 is a block diagram of a wireless network in accordance with some embodiments of the present disclosure;

FIG. 15 is a block diagram of a virtualization environment in accordance with some embodiments;

DETAILED DESCRIPTION

Figure 3:
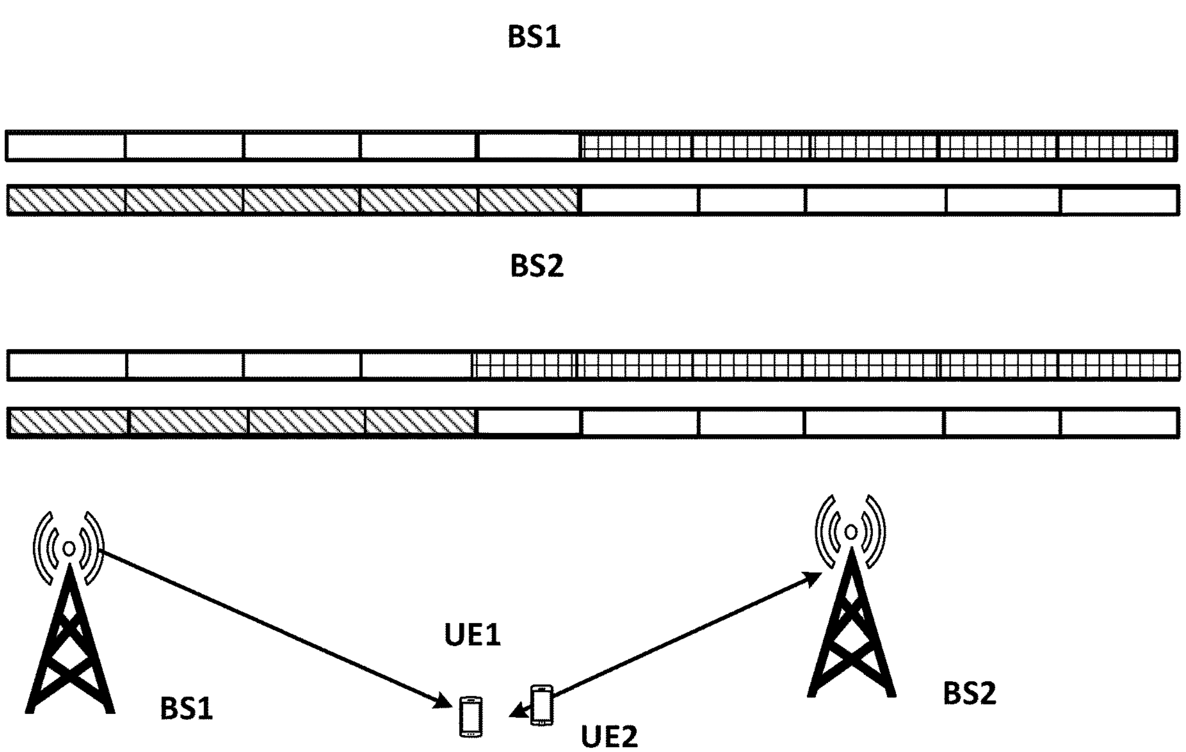
FIG. 3 is a schematic diagram illustrating two network nodes using different time division duplexing (TDD)

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

An approach for signal quality prediction discussed in a non-published internal reference implementation includes, based on received user equipment (UE) data from measurement reports, a telecommunication network can learn, for example, what sequence of signal quality measurements (e.g., reference signal received power (RSRP)) result in a large signal quality drop (e.g., turning around the corners in 101*b* of FIG. 1). For example, a periodic reported RSRP data may be divided into a training and prediction window as illustrated in 101*a* of FIG. 1.

Still referring to FIG. 1, in this example, two UEs are turning around the same corner according to the location plot. The UE having the solid line in FIG. 1, first turns around the corner and experiences a large signal quality drop. In one approach, to try to mitigate the drop of a second UE having the dashed line FIG. 1, learning from the first UE's experience may be used. FIG. 1 also illustrates how the two UEs have similar measured RSRP characteristics.

In such an approach, the learning may be done by feeding RSRP for time $t_1, \ldots, t_n$ into a machine learning (ML) model (e.g., a Neural network), and then learn the RSRP in time $t_{n+1}$, $t_{n+2}$.After the ML model is trained, the network may download the ML model to the UE, that then predicts future signal quality values. The signal quality prediction can then be used for a number of radio resource management (RRM) features such as: initiate inter-frequency handover; set handover/reselection parameters; change UE scheduler priority, for example, schedule UE when the expected signal quality is good; and link adaptation (LA). It is noted that there may be a time-delay from sending a channel quality indicator (CQI) value until it is used for LA.

A configured Channel State Information Reference Signal (CSI-RS) may be used to derive information about the properties of the channel over which the CSI-RS is transmitted. An interference level from neighboring gNodeBs (gNBs) may be estimated by subtracting the expected received signal from the received signal on the CSI-RS resource. However, the interference level may also be estimated from measurements on so-called CSI-IM (Interference Measurement) resources. The location for the CSI-IM resource in the time-frequency grid is part of the CSI-IM configuration. The CSI-IM resource could be periodic, semi-persistent, or aperiodic. Typically, a CSI-IM resource corresponds to time-frequency resources where nothing is transmitted within the current cell while, in neighboring cells, there should be traffic as normal. Measuring the receiver power within a CSI-IM resource, a device can get an estimate on the typical interference due to transmissions within other cells.

The following explanation of potential problems with some approaches is a present realization as part of the present disclosure and is not to be construed as previously known by others.

The non-published internal reference implementation discussed herein includes how a network can predict a future signal quality value for a second device based on similar movement for a first device. Such an approach can enable a UE to indicate that the signal quality will degrade due to, e.g. turning around corner, but does not provide any information on learning the interference that is experienced by the UE. The periodic interference can cause a large SINR degradation for some UEs. In FIG. 2 for instance, the traffic in neighboring nodes creates a large drop in SINR. Also, spotty interference peaks can degrade the overall link-adaptation algorithm since the gNB only receives sampled signal quality estimates from the device, where the sampled signal quality values can coincide with the interference peaks.

With flashlight interference created by beamforming in New Radio (NR) systems, it may be difficult for a UE serving gNB to estimate the interference experienced by the UE together with load information from its neighboring cell.

Various embodiments of the present disclosure may provide solutions to these and other potential problems. In some embodiments of the present disclosure, a method is provided that can enable UE (also referred to herein as a "communication device") reported predicted future interference values from signals stemming from gNBs, cells, SSB, CSI-RS beams, transmission points, etc., other than the UE's serving cell. In some embodiments, the network can request a UE to build a prediction model related to a certain resource, e.g. a set of resources not intended for any traffic in source cell. The network can also configure the UE with CSI-IM resources, which the UE could use to predict a future CSI-IM measurement. In some embodiments, the resources can be associated to a specific neighbor cell or associated to a combination of multiple neighbor cells. In some embodiments, the resources can be associated to a specific SSB beam or CSI-RS beam of a neighbor cell or combination of SSB beams/CSI-RS beams of at least one neighbor cell.

Figure 4:
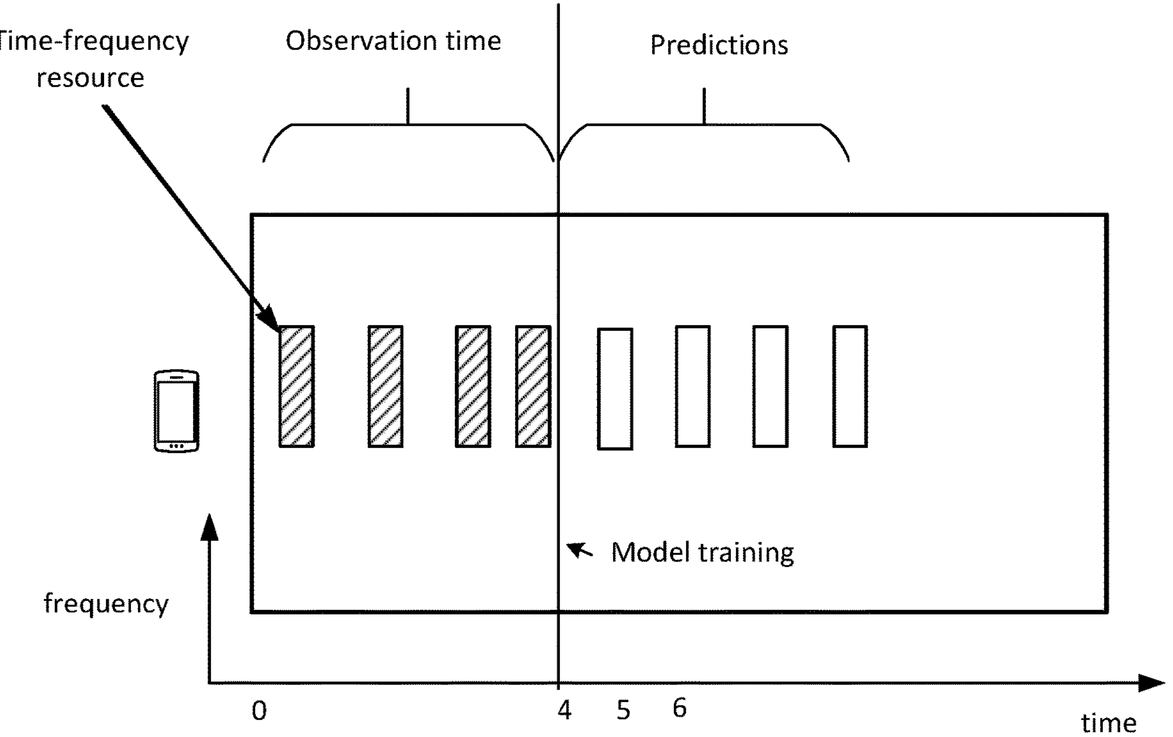
FIG. 4 is a schematic diagram illustrating an exemplary embodiment of a method in accordance with some embodiments of the present disclosure.

FIG. 4 is a schematic diagram illustrating an exemplary embodiment of a method in accordance with some embodiments of the present disclosure. Referring to FIG. 4, in the exemplary embodiment, at t=0, the UE connects to the gNB.

Still referring to FIG. 4, the gNB configures the UE to measure on a set of time-frequency resources. For example, where the UE serving cell are transmitting reference signals, or do not have any scheduled traffic, in order to enable the UE to predict a set of future interference values from neighboring nodes. The observation time can be a fixed time, or the UE can, e.g., indicate when it has created an accurate prediction model.

Still referring to FIG. 4, in some embodiments, the configuration can be specific to an area wherein the area can be defined as the region of the serving cell wherein the serving cell quality is above a certain threshold, the serving cell quality is below a threshold, one or more of neighboring cell quality is above a threshold, a specific neighboring cell quality is above a threshold, a specific neighboring cell quality is below a threshold, when the UE can hear a specific set of wireless local area network applications (WLAN Aps), when the UE can hear a specific set of Bluetooth beacons, or when the UE is in a geographical region as bounded by the configured coordinates, etc.

In some embodiments, the configuration can take into account information available at the gNB and not associated to the individual UE, such as: a traffic type (known or predicted) at gNB/cell level, indicating e.g. a certain inter-arrival time between packets, burst length; and/or at least one preferred frequency to be reported on (e.g., the one for which no reporting is yet available or the one for which the reported values are the oldest compared to other frequencies already reported in the past).

In some embodiments, the configuration can take into account some UE-specific related history information, or UE-related configuration, e.g.: the time elapsed since the last radio link failure (RLF) or channel estimation field (CEF); the time elapsed since the last handover; the time spent in the current cell; if known or derived by the gNB, the traffic type of the UE (e.g., deterministic periodic, deterministic aperiodic); the number of times in a given time interval for which the same UE has already been asked to perform measurements; the current quality of service (QoS) configuration in use; in case of multi-connectivity (e.g., E-UTRAN New Radio-Dual Connectivity (EN-DC), New Radio-Dual Connectivity (NR-DC)), the type of bearer in use (master cell group (MCG) terminated, secondary cell group (SCG) terminated, split bearer); the current radio resource control (RRC) state of the UE; and/or the traffic experienced by the device, for example number of received packets in a certain time-window.

Still referring to FIG. 4, in the exemplary embodiment, the UE trains an ML model based on the observed interference values during the observation time t0-t3. At t=4, the UE provides predicted interference values of future time instances (t5, t6, . . . ) comprising the resources used during the observation time. For example, the interference values of future CSI-IM resources. In some embodiments, the prediction can optionally include a confidence interval of the predicted interference estimate.

Still referring to FIG. 4, in some embodiments, the UE sends the predictions in an event triggered way, such as, the UE sends the predicted values only if the predicted values are above a threshold or below a threshold, or in between a first threshold and a second threshold, wherein the said thresholds and the said event is configured by the network. In some embodiments, the UE sends the predictions periodically, wherein the network configures the associated periodic intervals.

Still referring to FIG. 4, in some embodiments, the UE's serving gNB uses said information to, e.g., configure its link-adaptation or scheduling decisions. In some embodiments the link adaption or scheduling decisions include, e.g., to set the modulation and coding scheme based on the predicted interference rather than the previously reported measured interference.

Potential advantages provided by various embodiments of the present disclosure may include that by building and utilizing UE predictions of the UE's experienced interference in the network, RRM operations may be improved, such as link-adaptation. This is in contrast with some approaches which focus on predicting the signal quality based on similar movement of a first device. Various embodiments of the present disclosure include a UE building a prediction upon connection to the network. While AI/ML may be used at a device in order to detect patterns in interference pulses, there is currently no method in standards supporting a device reported future predicted interference pulse. With the new traffic types, such as sensor data for industrial application, the traffic pattern can be more deterministic, hence also the interference can be more deterministic. This predictability may enable AI/ML methods to be utilized in order for the UE to predict a future interference based on its historically experienced interference.

A UE cannot deduce which traffic comes from its serving cell, and what traffic comes from its neighboring cell. Hence, in order to build an accurate prediction model of inter-cell interference, the UE needs information of the traffic in its serving cell or information of the traffic served by the same portion of the serving cell (e.g. SSB beam or transmission point) towards which it is currently connected to, which is not available today. Otherwise, the UE will treat serving cell traffic as interference in the prediction model. Additional potential advantages provided by various embodiments of the present disclosure may include signaling enabling the UE serving cell to signal traffic information to the UE.

Additional potential advantages provided by various embodiments of the present disclosure may include that the gNB can receive predicted interference caused by beamforming configurations in neighboring cells. This is information that may be hard to retrieve/estimate using only load information signaling from the UE neighboring cells.

Various embodiments of the present disclosure include receiving interference predictions from the UE, based on the UE's historical observations of interference values from a specific resource. The resource describes the signal type or time-frequency location where the UE should predict the interference magnitude.

In some embodiments, the resources comprise a reference signal in a serving node (e.g. SSB or CSI-RS). The UE can remove the desired signal in order to create an interference measurement (in case the signal is not a CSI-IM resource).

In some embodiments, the resources comprise a set of resources when there is no traffic or reference signal scheduled in the serving node. A set of time-frequency resources can be defined using a subband index or a bandwidth part.

In some embodiments, the selected set of resources can be aligned to a certain information known at the gNB and not necessarily related to the individual UE being addressed, such as: a traffic type (known or predicted) at gNB/cell level, indicating e.g. a certain inter-arrival time between packets, burst length; and/or at least one preferred frequency to be reported on (e.g. the one for which no reporting is yet available or the one for which the reported values are the oldest compared to other frequencies already reported in the past).

In some embodiments, the selected set of resources can take into account some UE-specific related history information, or UE-related configuration, e.g.: the most recent visited frequencies/cells by the UEs; the time elapsed since the last RLF or CEF; the time elapsed since the last handover; the time spent in the current cell; if known or derived by the gNB, the traffic type of the UE (e.g. deterministic periodic, deterministic aperiodic); the number of times in a given time interval for which the same UE has already been asked to perform measurements; the current QoS configuration in use; in case of multi-connectivity (e.g. EN-DC, NR-DC), the type of bearer in use (MCG terminated, SCG terminated, split bearer); and/or the current RRC state of the UE.

In some embodiments, the configuration can be specific to an area wherein the area can be defined as the region of the serving cell wherein the serving cell quality is above a certain threshold, the serving cell quality is below a threshold, one or more of neighboring cell quality is above a threshold, a specific neighboring cell quality is above a threshold, a specific neighboring cell quality is below a threshold, when the UE can hear a specific set of WLAN Aps, when the UE can hear a specific set of Bluetooth beacons, or when the UE is in a geographical region as bounded by the configured coordinates, etc.

In some embodiments, the observation time can be a fixed time, or the UE can, e.g., indicate when it has created an accurate prediction model.

Network signaling will now be discussed.

In some embodiments, the network can ask for capabilities in a UE predicted interference value for a certain time-frequency resource. In another embodiment, a capable UE can indicate that it is able to use AI/ML techniques to learn what signals are from neighboring nodes with respect to its serving node by observing RSRP, reference signal received quality (RSRQ) and received signal strength indicator (RSSI) measurements over time, and thus estimate when the interfering traffic is not coming from the serving cell.

In some embodiments, based on the UE capabilities, the gNB configures the UE of the time-frequency resources of which the UE can use for predicting a future interference value. For example, based on the time-frequency resources where there is no traffic in the UE serving cell. In another embodiment, the gNB can, e.g., send a broadcast transmission that it has no scheduled UEs, enabling capable UEs to predict an interference estimate. The configuration can be based on that the UE is expected to have a long traffic session (e.g. video-streaming UE). It can also be based on whether previous UEs have successfully aided the network with interference predictions.

In some embodiments, the gNB can configure the UE to build interference predictions using its transmitted reference signals such as non-zero-power CSI-RS or Synchronizations Signal PBCH (SSB), which can be used by the UE in order to subtract the reference signals from the received signal in order to get an interference estimate.

In another embodiment, the resource used for building a prediction model can comprise the resources used for periodic CSI-IM.

In some embodiments, the gNB also configures a prediction reporting condition to the UE, for example: to report its predictions related to a future resource, such as related to a certain reference signal or related to a time-frequency resource represented by one or more sub-band indices plus a subframe number(s); to report periodical prediction of next T time-instances; to report a specific confidence interval of the predictions, for example, the UE reported confidence interval can be based on 90% certainty, or the predicted value is within the confidence interval range; and/or to report the predictions when certain configured conditions are met.

In some embodiments, the prediction reporting configuration is specific to an area wherein the area could be defined as the region of the serving cell wherein the serving cell quality is above a certain threshold, the serving cell quality is below a threshold, one or more of neighboring cell quality is above a threshold, a specific neighboring cell quality is above a threshold, a specific neighboring cell quality is below a threshold, when the UE can hear a specific set of WLAN Aps, when the UE can hear a specific set of Bluetooth beacons, and/or when the UE is in a geographical region as bounded by the configured coordinates, etc.

In some embodiments, the condition is related to the UE's current application or QoS configuration under usage.

In some embodiments, the condition is related to the UE's current BSR (assuming this is a TDD spectrum) indicating the buffer status to be above/below a certain threshold.

In some embodiments, the gNB can request a neighboring node to signal its predicted future load value. Based on the predicted future load, the gNB can configure a UE to build a prediction model of its experienced interference. The neighboring node can also signal its used time-frequency resources for its current scheduled traffic, the UE serving gNB can use this information in order to configure a UE to observe interference measurements in said resources.

UE reporting will now be discussed.

In some embodiments, the UE signals capabilities in predicting a future interference measurement for a certain resource. The capabilities can also include a performance metric describing the accuracy of the historical predictions. This can be represented with average standard deviation of the prediction accuracy, maximum or minimum value of the accuracy, etc.

In some embodiments, a method includes a UE estimating future signal measurements. The UE can build predictions based on non-reference signals, where the time-frequency resources do not contain any traffic from the UE serving node, or the UE is capable in deducting which signals stems from its serving gNB. The UE can also build predictions based on reference signals. The UE can provide a predicted interference value for a certain reference signal, for example a CSI-RS or SSB. The UE can provide an interference measurement for the above reference signals by subtracting the desired signal, or by predictions on CSI-IM resources.

In some embodiments, an ML model(s) to predict the future interference value can comprise decision trees, random forest, feed forward neural networks, autoregressive models or convolutional neural networks. The input for the ML model can comprise feeding interference values in $t_1, \ldots, t_n$ into a machine learning model (e.g. Neural Network), and then learn the interference in $t_{n+1}$, $t_{n+2}$. For example, in FIG. 2 in some embodiments, the UE in cell 2 can signal its predicted interference from the UE in cell 1. The prediction can be based on the received interference of the transmitted packets from t=3 to t=23 seconds for UE 1. Next, based on receiving the prediction, cell 2 can, for example, not schedule any traffic in predicted interfering slots, or set link-adaptation based on predicted traffic. In another exemplary embodiment, referring to FIG. 3, an artificial intelligence (AI)/ML model can be used at UE 2 to detect the heavy interreference caused by the uplink from UE 1.

In some embodiments, an interference prediction report can comprise a predicted time-instance. For example: subframe number, slot index, and system frame number. Or an absolute time using Coordinated Universal Time (UTC); a predicted time-window; predicted resources; a predicted reference signal (e.g. SSB, CSI-RS); predicted time-frequency resources; a predicted interference value using the available reporting metrics (e.g., SINR, RSRQ, RSRP, RSSI, CQI, Interference plus Noise estimate); a probability that the interference power is above or below a certain threshold value; a predicted throughput value or throughput increase or decrease based on the predicted interference and the current serving cell quality in terms of serving cell link beam quality (serving cell CSI); a predicted throughput value or throughput increase or decrease based on the predicted interference and the predicted current serving cell quality in terms of serving cell link beam quality (serving cell CSI); a confidence interval of the predicted interference value, for example that the predicted value is within a certain interval with 90% probability or a standard deviation value of the predicted information, etc.

Figure 5:
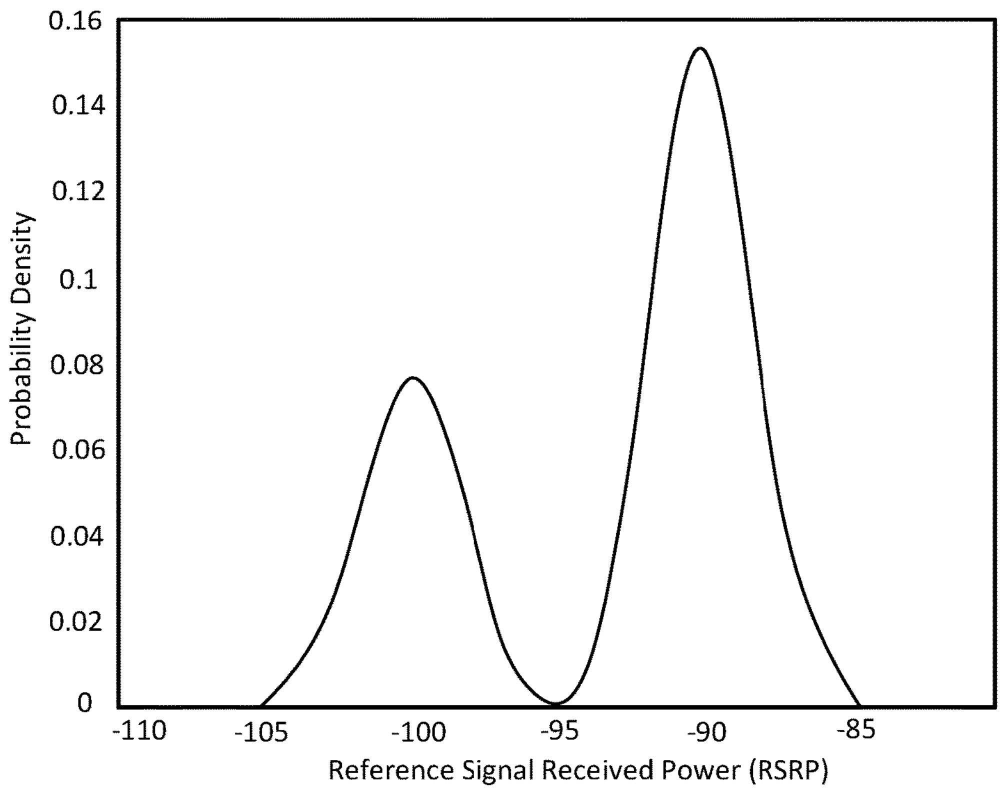
FIG. 5 is a plot illustrating an exemplary embodiment of Gaussian mixtures for network requested time-instances in accordance with some embodiments of the present disclosure.

In some embodiments, the prediction can be reported as a probability density function, using Gaussian mixtures for each of the network requested time-instances as illustrated in FIG. 5. FIG. 5 illustrates mixed Gaussian with two components. Component 1: mean=−100, sigma=1, component weight=⅓. Component 2: mean=−90, sigma=1, component weight=⅔. The prediction is reported using the parameters describing the mixed gaussian components, e.g., its mean, variation and component weight for each of the components.

In some embodiments, the predicted interference can be described using an Autoregressive model (AR-model). The autoregressive model can operate such that a time-series value is regressed on previous values from that same time series. For example, in some embodiments, the AR-model with two components is:

$$y_t=\beta_0+\beta_1 y_{t-1}+\beta_2 y_{t-2}+\epsilon_t$$

In some embodiments, using an AR model, the UE can signal the AR-model coefficients, and the network uses its previous received UE interference measurements in a number of time instances (t−1, t−2, . . . ), in combination with the AR-coefficients to calculate the interference predictions. The UE can also indicate the time-sampling of the AR-model, for example it is number of seconds between each interference values.

Various embodiments of the present disclosure include a method to configure a UE to observe interference measurements on a certain resource (for example, a reference signal) for a time window; configure a UE to train an ML model based on the observed interference measurements during said time window; and receive a UE predicted future interference values from said resource.

Figure 6:
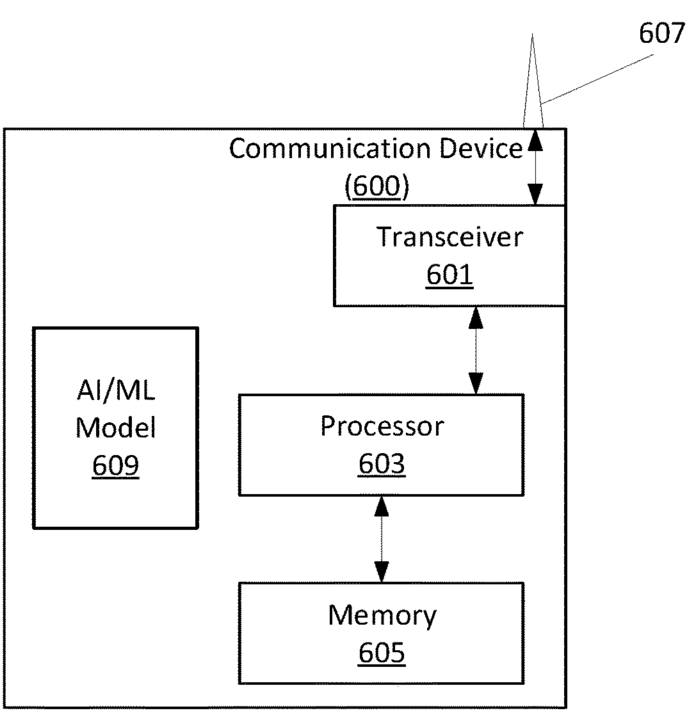
FIG. 6 is a block diagram illustrating a communication device in accordance with some embodiments of the present disclosure.

FIG. 6 is a block diagram illustrating elements of a wireless device UE 600 (also referred to as a communication device, mobile terminal, a mobile communication terminal, a wireless communication device, a wireless terminal, mobile device, a wireless communication terminal, user equipment, UE, a user equipment node/terminal/device, etc.) configured to provide wireless communication according to embodiments of the present disclosure. (Wireless device 600 may be provided, for example, as discussed below with respect to wireless device 4110 of FIG. 13.) As shown, wireless device UE may include an antenna 607 (e.g., corresponding to antenna 4111 of FIG. 13), and transceiver circuitry 601 (also referred to as a transceiver, e.g., corresponding to interface 4114 of FIG. 13) including a transmitter and a receiver configured to provide uplink and downlink radio communications with a base station(s) (e.g., corresponding to network node 4160 of FIG. 13, also referred to as a radio access node (RAN node)) of a radio access network. Wireless device UE may also include processing circuitry 603 (also referred to as a processor, e.g., corresponding to processing circuitry 4120 of FIG. 13) coupled to the transceiver circuitry, and memory circuitry 605 (also referred to as memory, e.g., corresponding to device readable medium 4130 of FIG. 13) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that separate memory circuitry is not required. Wireless device UE may also include an interface (such as a user interface) coupled with processing circuitry 603, and/or wireless device UE may be incorporated in a vehicle.

As discussed herein, operations of wireless device UE may be performed by processing circuitry 603 and/or transceiver circuitry 601. For example, processing circuitry 603 may control transceiver circuitry 601 to transmit communications through transceiver circuitry 601 over a radio interface to a radio access network node (also referred to as a base station) and/or to receive communications through transceiver circuitry 601 from a RAN node over a radio interface. Moreover, modules may be stored in memory circuitry 605, and these modules may provide instructions so that when instructions of a module are executed by processing circuitry 603, processing circuitry 603 performs respective operations (e.g., operations discussed herein with respect to example embodiments relating to wireless devices).

Figure 7:
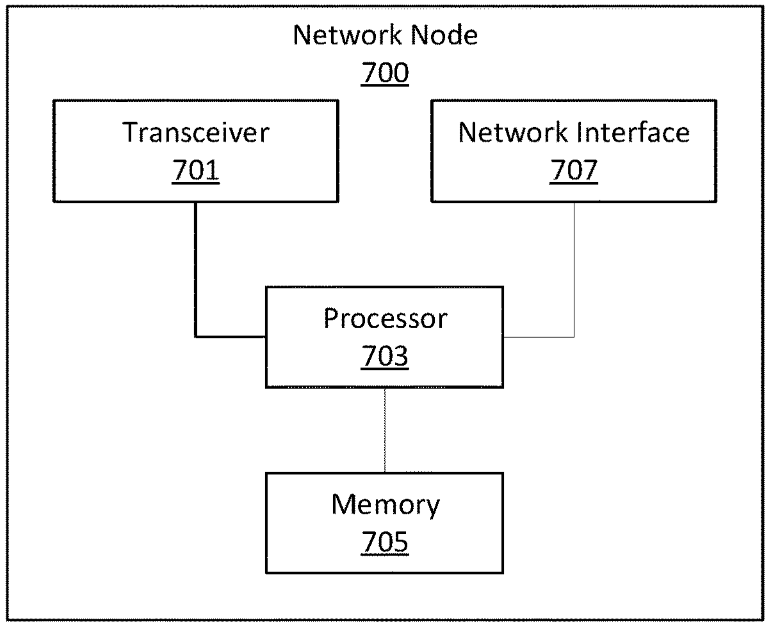
FIG. 7 is a block diagram illustrating a network node in accordance with some embodiments of the present disclosure.

FIG. 7 is a block diagram illustrating elements of a radio access network RAN node 700 (also referred to as a network node, base station, eNodeB/eNB, gNodeB/gNB, etc.) of a Radio Access Network (RAN) (e.g., a telecommunications network) configured to provide cellular communication according to embodiments of present disclosure. (RAN node 700 may be provided, for example, as discussed below with respect to network node 4160 of FIG. 13.) As shown, the RAN node may include transceiver circuitry 701 (also referred to as a transceiver, e.g., corresponding to portions of interface 4190 of FIG. 13) including a transmitter and a receiver configured to provide uplink and downlink radio communications with mobile terminals. The RAN node may include network interface circuitry 707 (also referred to as a network interface, e.g., corresponding to portions of interface 4190 of FIG. 13) configured to provide communications with other nodes (e.g., with other base stations) of the RAN and/or core network CN. The network node may also include processing circuitry 703 (also referred to as a processor, e.g., corresponding to processing circuitry 4170) coupled to the transceiver circuitry, and memory circuitry 705 (also referred to as memory, e.g., corresponding to device readable medium 4180 of FIG. 13) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that a separate memory circuitry is not required.

As discussed herein, operations of the RAN node may be performed by processing circuitry 703, network interface 707, and/or transceiver 701. For example, processing circuitry 703 may control transceiver 701 to transmit downlink communications through transceiver 701 over a radio interface to one or more mobile terminals UEs and/or to receive uplink communications through transceiver 701 from one or more mobile terminals UEs over a radio interface. Similarly, processing circuitry 703 may control network interface 707 to transmit communications through network interface 707 to one or more other network nodes and/or to receive communications through network interface from one or more other network nodes. Moreover, modules may be stored in memory 705, and these modules may provide instructions so that when instructions of a module are executed by processing circuitry 703, processing circuitry 703 performs respective operations (e.g., operations discussed herein with respect to example embodiments relating to RAN nodes).

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 8:
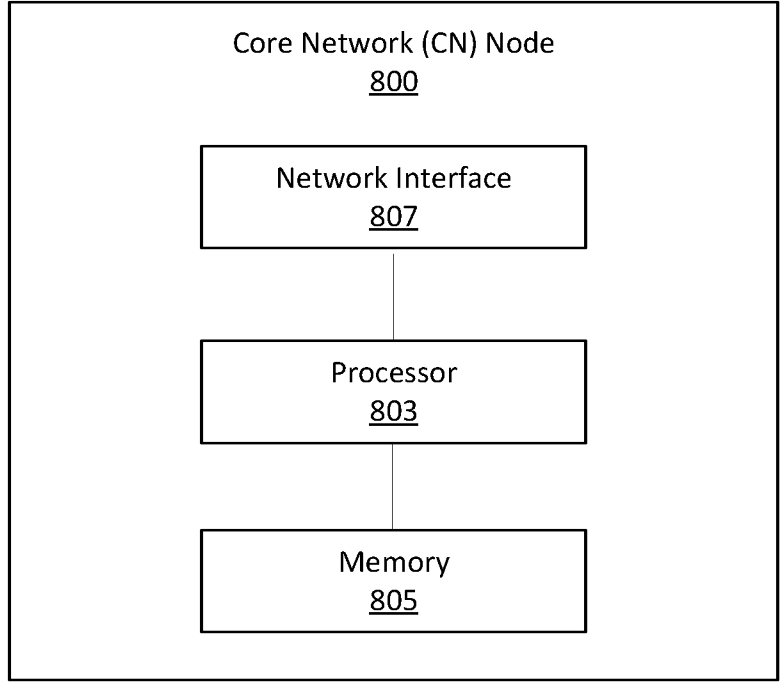
FIG. 8 is a block diagram illustrating a core network node in accordance with some embodiments of the present disclosure.

FIG. 8 is a block diagram illustrating elements of a core network CN node 800 (e.g., an SMF node, an AMF node, etc.) of a telecommunication network configured to provide cellular communication according to embodiments of inventive concepts. As shown, the CN node may include network interface circuitry 807 (also referred to as a network interface) configured to provide communications with other nodes of the core network and/or the radio access network RAN. The CN node may also include a processing circuitry 803 (also referred to as a processor) coupled to the network interface circuitry, and memory circuitry 805 (also referred to as memory) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that a separate memory circuitry is not required.

As discussed herein, operations of the CN node may be performed by processing circuitry 803 and/or network interface circuitry 807. For example, processing circuitry 803 may control network interface circuitry 807 to transmit communications through network interface circuitry 807 to one or more other network nodes and/or to receive communications through network interface circuitry from one or more other network nodes. Moreover, modules may be stored in memory 805, and these modules may provide instructions so that when instructions of a module are executed by processing circuitry 803, processing circuitry 803 performs respective operations (e.g., operations discussed herein with respect to example embodiments relating to core network nodes).

While some embodiments discussed herein are explained in the non-limiting context of a UE and a gNB, the invention is not so limited. Instead, the UE is non-specific and any communication device for a telecommunication network can be used. As used herein a communication device refers to a device capable, configured, arranged and/or operable to communicate wirelessly with network nodes and/or other wireless devices. Unless otherwise noted, the term communication device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a communication device may be configured to transmit and/or receive information without direct human interaction. For instance, a communication device may be designed to transmit information to a network on a predetermined schedule, when triggered by an internal or external event, or in response to requests from the radio communication network. Examples of a communication device include, but are not limited to, a smart phone, a mobile phone, a cell phone, a voice over IP (VoIP) phone, a wireless local loop phone, a desktop computer, a personal digital assistant (PDA), a wireless camera, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A communication device may support device-to-device (D2D) communication, for example by implementing a 3GPP standard for sidelink communication, and may in this case be referred to as a D2D communication device. As yet another specific example, in an Internet of Things (IoT) scenario, a communication device may represent a machine or other device that performs monitoring and/or measurements, and transmits the results of such monitoring and/or measurements to another communication device and/or a network node. The communication device may in this case be a machine-to-machine (M2M) device, which may in a 3GPP context be referred to as a machine-type communication (MTC) device. As one particular example, the communication device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a communication device may represent a vehicle or other equipment that is capable of monitoring and/or reporting on its operational status or other functions associated with its operation. A communication device as described above may represent the endpoint of a wireless connection, in which case the device may be referred to as a wireless terminal. Furthermore, a communication device as described herein may be mobile, in which case it may also be referred to as a mobile device or a mobile terminal.

The gNB also is non-specific and any network for a telecommunication network can be used. As used herein, network node refers to equipment capable, configured, arranged and/or operable to communicate directly or indirectly with a communication device/user device and/or with other network nodes or equipment in the radio telecommunication network to enable and/or provide wireless access to the communication device/user device and/or to perform other functions (e.g., administration) in the radio telecommunication network. Examples of network nodes include, but are not limited to, a gNode B (gNB), access points (APs) (e.g., radio access points), base stations (BSs) (e.g., radio base stations, Node Bs, evolved Node Bs (eNBs), gNode Bs, etc. Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node. More generally, however, network nodes may represent any suitable device (or group of devices) capable, configured, arranged, and/or operable to enable and/or provide a communication device with access to the radio telecommunication network or to provide some service to a communication device that has accessed the radio telecommunication network Now that the operations of the various components have been described, operations specific to a network node 700 for a telecommunications network (implemented using the structure of the block diagram of FIG. 7) will now be discussed with reference to the flow charts of FIGS. 9 and 10 according to various embodiments of the present disclosure. As shown, network node 700 may include network interface circuitry 707 (also referred to as a network interface) configured to provide communications with other nodes of the telecommunications network. Network node 700 may also include a processing circuitry 703 (also referred to as a processor) coupled to the network interface circuitry, and memory circuitry 705 (also referred to as memory) coupled to the processing circuitry 703. The memory circuitry 705 may include computer readable program code that when executed by the processing circuitry 703 causes the processing circuitry 703 to perform respective operations of the flow charts of FIGS. 9 and 10 according to embodiments disclosed herein.

Figures 9, 10:
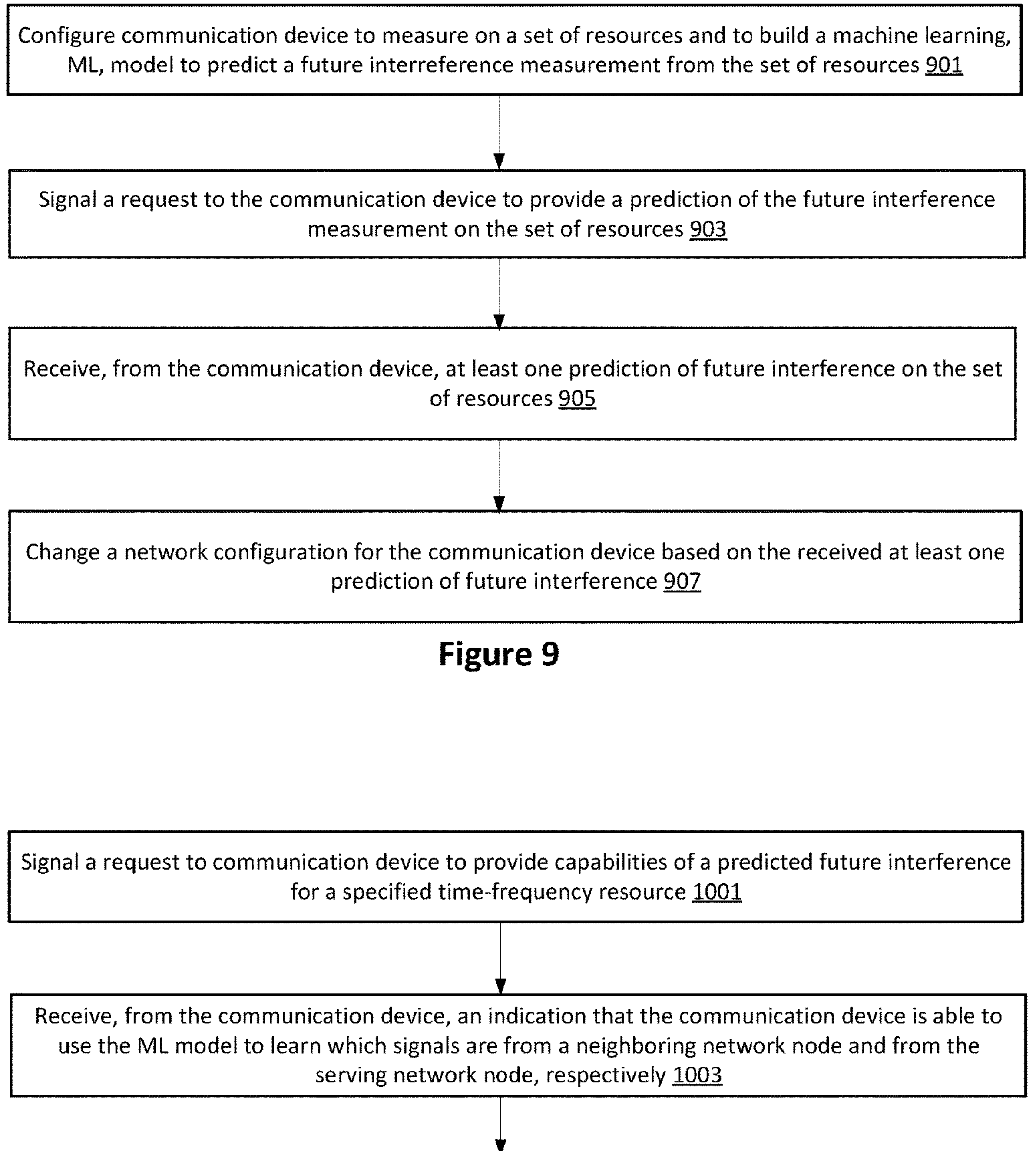
FIGS. 9-10 are flow charts of operations performed by a network node according to various embodiments of the present disclosure.

Each of the operations described in FIGS. 9 and 10 can be combined and/or omitted in any combination with each other, and it is contemplated that all such combinations fall within the spirit and scope of this disclosure.

Referring to FIG. 9, a method performed by a network node (e.g., 700) is provided for a telecommunications network for handling interference variations for a communication device. The method includes configuring (901) the communication device to measure on a set of resources and to build a machine learning, ML, model to predict a future interference measurement from the set of resources. The method further includes signaling (903) a request to the communication device to provide a prediction of the future interference measurement on the set of resources. The method further includes receiving (905), from the communication device, at least one prediction of future interference on the set of resources. The method further includes changing (907) a network configuration for the communication device based on the received at least one prediction of future interference.

In some embodiments, the changing (907) a network configuration includes a scheduling, an inter-frequency handover decision, an intra-frequency handover decision, or at least one link-adaptation setting.

In some embodiments, the set of resources include a set of resources that are not planned for any traffic in a source cell of the network node.

In some embodiments, the at least one prediction of future interference received from the communication device based on a historical interference measurement comprises historical observations of the communication device of interference values from a specific resource, wherein the specific resource indicates a signal type or a time-frequency location where the communication device can predict an interference magnitude.

In some embodiments, the specific resource comprises one of a reference signal in a serving network node or a set of resources when there is no traffic or reference signal scheduled in the serving network node.

In some embodiments, the set of resources take into account history information of a communication device or a communication device related configuration.

In some embodiments, the configuration comprises one of the following: a configuration specific to an area, wherein the area is a region of a serving cell, wherein the serving cell quality is above a certain threshold or the serving cell quality is below a threshold, one or more of a neighboring cell quality is above a threshold, a specific neighboring cell quality is above a threshold, a specific neighboring cell quality is below a threshold, when the UE can hear a specific set of wireless local area network applications, when the UE can hear a specific set of Bluetooth beacons, or when the UE is in a geographical region as bounded by a configured coordinates.

Referring to FIG. 10, in some embodiments, the method further includes signaling (1001) a request to the communication device to provide capabilities of a predicted future interference for a specified time-frequency resource. The method further includes receiving (1003), from the communication device, an indication that the communication device is able to use the ML model to learn which signals are from a neighboring network node and from the serving network node, respectively, wherein indication is based on the communication device observing at least one of a reference signal received power, RSRP, measurement, a reference signal received quality, RSRQ, measurement, and a reference signal strength indicator, RSSI, measurement over a time period.

In some embodiments, the configuring (901) includes a configuration of at least one of the following: a time-frequency resource for use in predicting the at least one prediction of future interference, indicating to the communication device to build the at least one prediction of future interference using a transmitted reference signal of the communication device, a resource used for a periodic Channel State Information Interference Measurement, CSI-IM, and indicating to the communication device to build the ML model based on historical interference of the communication device with a neighboring network node.

Referring again to FIG. 10, in some embodiments, the method further includes configuring (1005) the communication device to report a condition related to the at least one prediction of future interference to the network node.

In some embodiments, the at least one prediction of future interference is based on at least one of a non-reference signal and a reference signal.

In some embodiments, the ML model comprises one of a decision tree, a random forest, a feed forward neural network, an autoregressive model, or a convolutional neural network.

The various operations 1001-1005 from the flow chart of FIG. 10 may be optional with respect to some embodiments of a method performed by a network node for telecommunications network.

Operations specific to a communication device (e.g., 600) in a telecommunications network (implemented using the structure of the block diagram of FIG. 6) will now be discussed with reference to the flow charts of FIGS. 11 and 12 according to various embodiments of the present disclosure. As shown, communication device 600 may include network interface circuitry 607 (also referred to as a network interface) configured to provide communications with other nodes of the telecommunications network. Communication device 600 may also include a processing circuitry 603 (also referred to as a processor) coupled to the network interface circuitry, and memory circuitry 605 (also referred to as memory) coupled to the processing circuitry 603. The memory circuitry 605 may include computer readable program code that when executed by the processing circuitry 603 causes the processing circuitry 603 to perform respective operations of the flow charts of FIGS. 11 and 12 according to embodiments disclosed herein.

Figure 11:
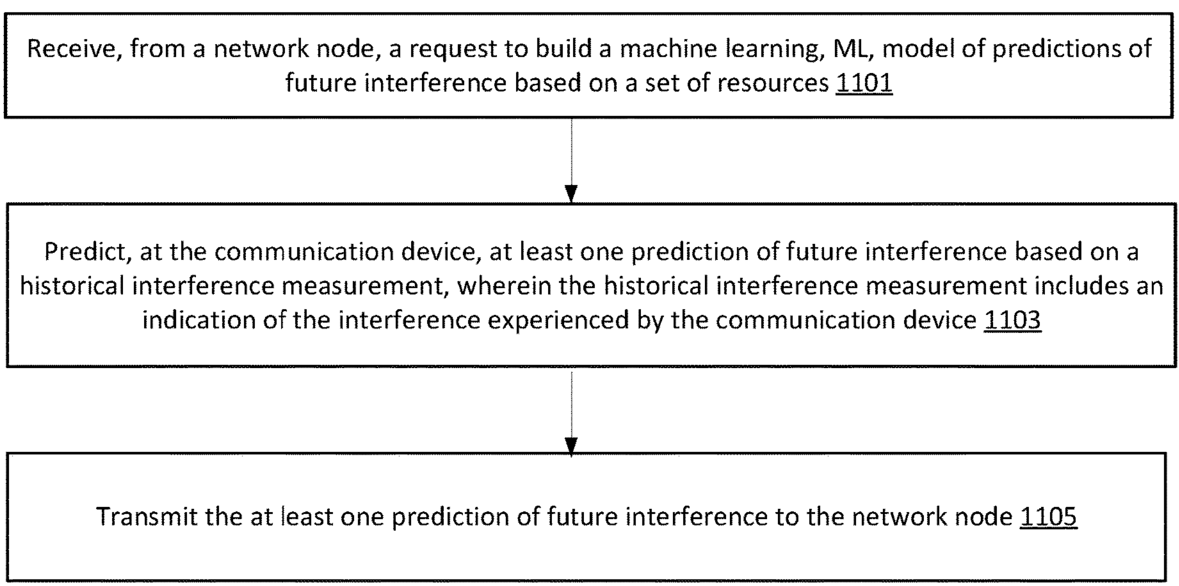
FIGS. 11-12 are flow charts of operations performed by a communication device according to various embodiments of the present disclosure.
Figure 12:
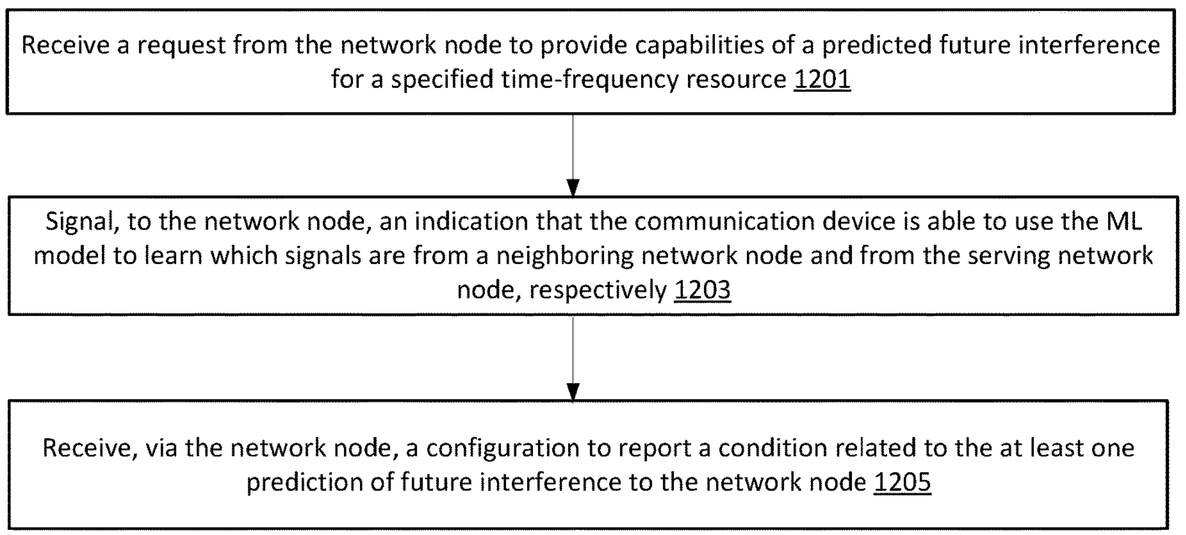

Further, modules may be stored in memory 605, and these modules may provide instructions so that when the instructions of a module are executed by respective computer processing circuitry of an AI/ML model, processing circuitry of the AI/ML model performs respective operations of the flow charts of FIGS. 11 and 12 according to embodiments disclosed herein.

As discussed herein, operations of the communication device 600 can be performed by the AI/ML model, pressor 603, and/or network interface circuitry 607. For example, the AI/ML model may control network interface circuitry 607 to transmit communications through network interface circuitry 607 to one or more network nodes and/or to receive communications through network interface circuitry from one or more network nodes.

Each of the operations described in FIGS. 11 and 12 can be combined and/or omitted in any combination with each other, and it is contemplated that all such combinations fall within the spirit and scope of this disclosure.

Referring to FIG. 11, a method performed by a communication device in a telecommunications network for predicting interference variations is provided. The method includes receiving (1101), from a network node, a request to build a machine learning, ML, model of predictions of future interference based on a set of resources. The method further includes predicting (1103), at the communication device, at least one prediction of future interference based on a historical interference measurement. The historical interference measurement comprises an indication of the interference experienced by the communication device. The method further includes transmitting (1105) the at least one prediction of future interference to the network node.

In some embodiments, the set of resources comprise a set of resources that are not planned for any traffic in a source cell of the network node.

In some embodiments, the at least one prediction of future interference based on a historical interference measurement comprises historical observations of the communication device of interference values from a specific resource, wherein the specific resource indicates a signal type or a time-frequency location where the communication device can predict an interference magnitude.

In some embodiments, the specific resource comprises one of a reference signal in a serving network node or a set of resources when there is no traffic or reference signal scheduled in the serving network node.

In some embodiments, the set of resources take into account history information of the communication device or a configuration related to the communication device.

In some embodiments, the configuration comprises one of the following: a configuration specific to an area, wherein the area is a region of a serving cell, wherein the serving cell quality is above a certain threshold or the serving cell quality is below a threshold, one or more of a neighboring cell quality is above a threshold, a specific neighboring cell quality is above a threshold, a specific neighboring cell quality is below a threshold, when the UE can hear a specific set of wireless local area network applications, when the UE can hear a specific set of Bluetooth beacons, or when the UE is in a geographical region as bounded by a configured coordinates.

Referring now to FIG. 12, in some embodiments, the method further includes receiving (1201) a request from the network node to provide capabilities of a predicted future interference for a specified time-frequency resource. The method further includes signaling (1203), to the network node, an indication that the communication device is able to use the ML model to learn which signals are from a neighboring network node and from the serving network node, respectively, wherein indication is based on the communication device observing at least one of a reference signal received power, RSRP, measurement, a reference signal received quality, RSRQ, measurement, and a reference signal strength indicator, RSSI, measurement over a time period.

In some embodiments, the communication device measures on the set of resources configured by the network node, wherein the configuration comprises at least one of the following: a time-frequency resource for use in predicting the at least one prediction of future interference, an indication to the communication device to build the at least one prediction of future interference using a transmitted reference signal of the communication device, a resource used for a periodic Channel State Information Interference Measurement, CSI-IM, and an indication to the communication device to build the ML model based on historical interference of the communication device with a neighboring network node.

Referring again to FIG. 12, in some embodiments, the method further includes receiving (1205), via the network node, a configuration to report a condition related to the at least one prediction of future interference to the network node.

In some embodiments, the at least one prediction of future interference is based on at least one of a non-reference signal and a reference signal.

In some embodiments, the ML model comprises one of a decision tree, a random forest, a feed forward neural network, an autoregressive model, or a convolutional neural network.

The various operations 1201-1205 from the flow chart of FIG. 12 may be optional with respect to some embodiments of a method performed by a communication device in a telecommunications network.

It is considered to be known to a person skilled in the art how to build, or set up, a machine learning, ML, model given particular input parameters and for predicting particular output parameters. For the present disclosure the input parameters are historical interference measurements, as defined herein, and the parameters the ML model are designed to predict are future interference on a set of resources, as defined herein. As mentioned, the ML model may for example be implemented by applying decision trees, random forest, feed forward neural networks, autoregressive models or convolutional neural networks.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 13 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4190 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 13 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4114 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 14:
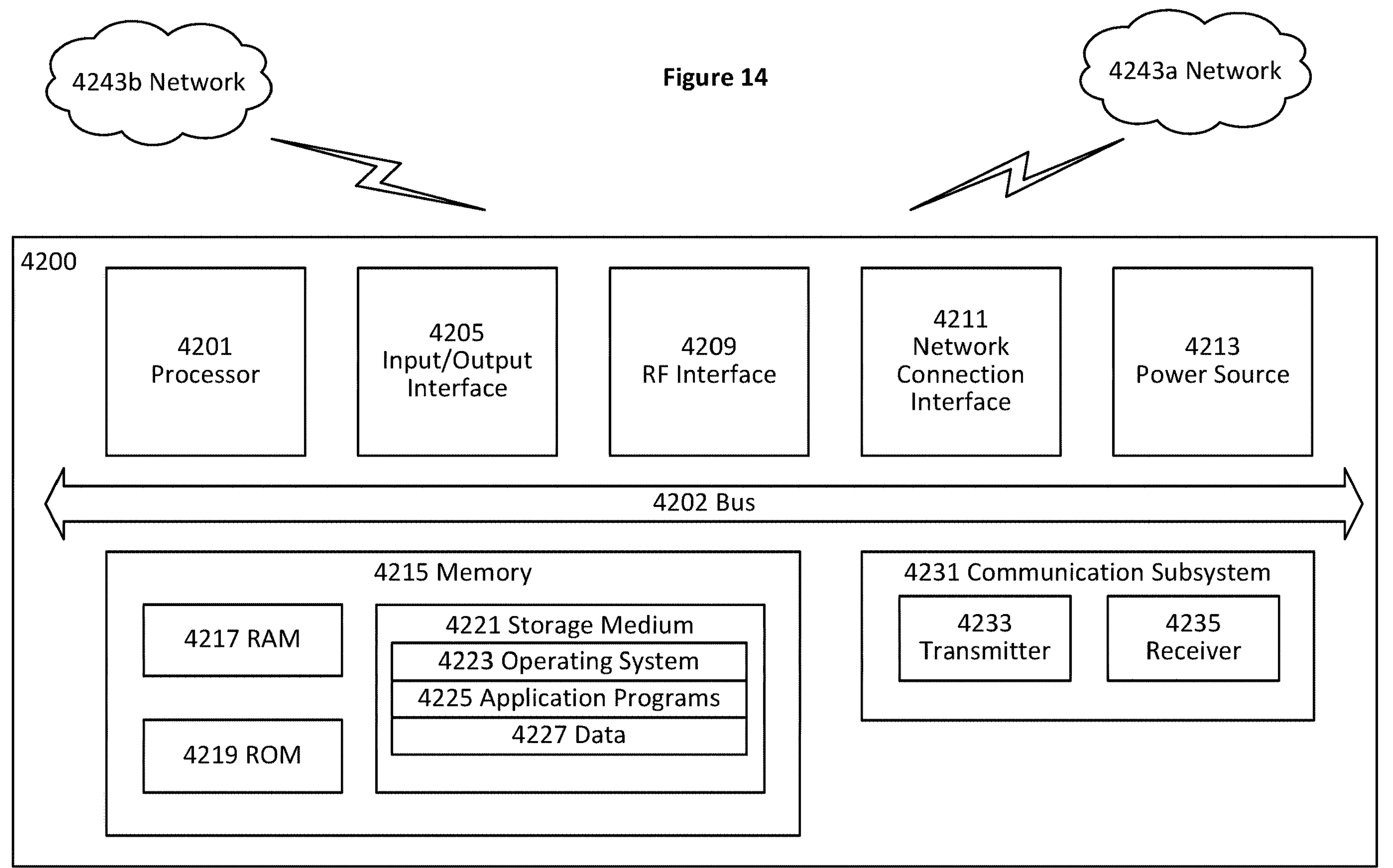
FIG. 14 is a block diagram of a user equipment in accordance with some embodiments

FIG. 14 illustrates a user Equipment in accordance with some embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 14, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4233, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 14, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

FIG. 15 illustrates a virtualization environment in accordance with some embodiments.

FIG. 15 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 15, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 15.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 16:
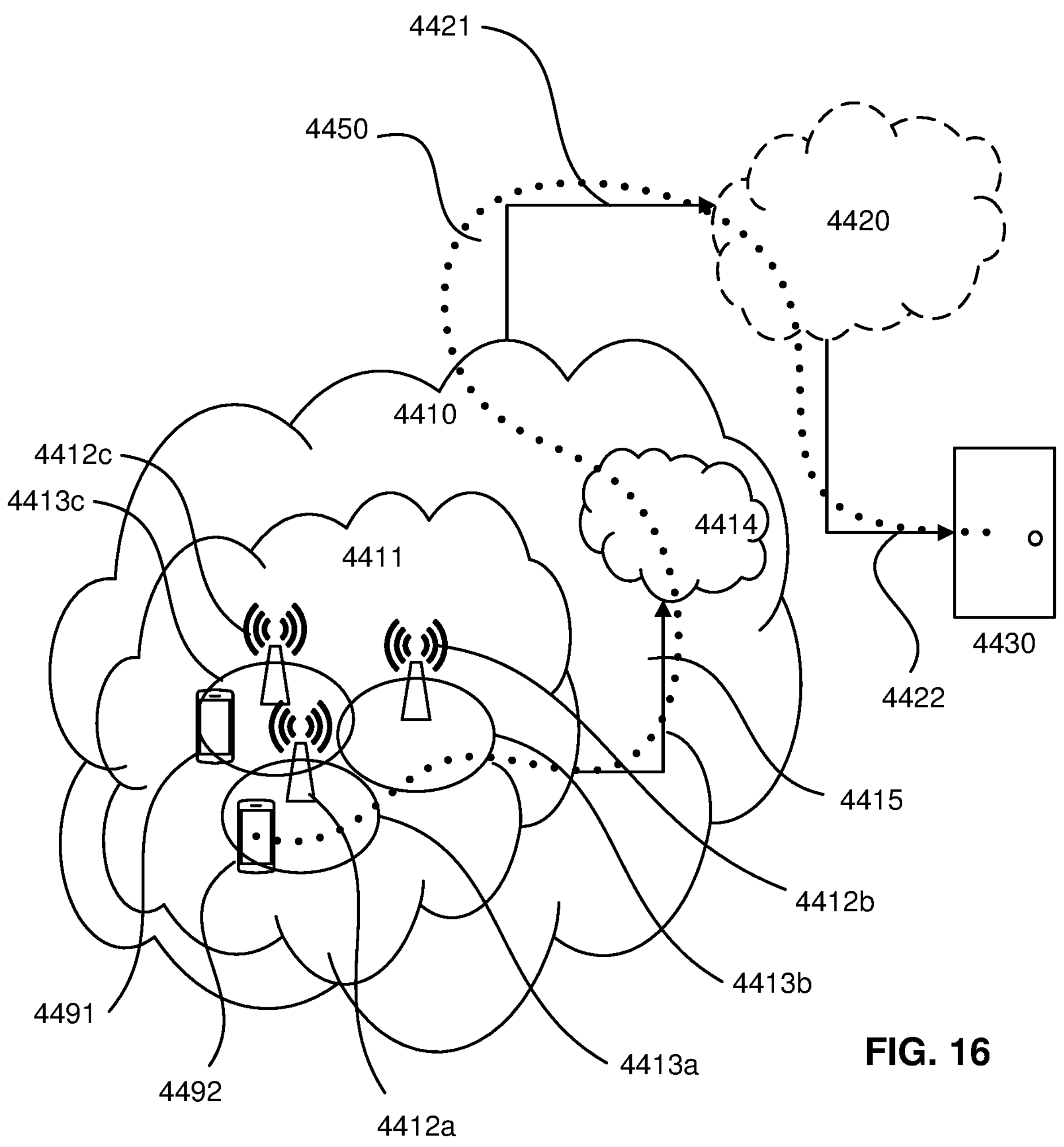
FIG. 16 is a block diagram of a telecommunication network connected via an intermediate network to a host computer in accordance with some embodiments.

FIG. 16 illustrates a telecommunication network connected via an intermediate network to a host computer in accordance with some embodiments.

With reference to FIG. 16, in accordance with an embodiment, a communication system includes telecommunication network 4410, such as a 3GPP-type cellular network, which comprises access network 4411, such as a radio access network, and core network 4414. Access network 4411 comprises a plurality of base stations 4412*a*, 4412*b*, 4412*c*, such as NBs, eNBs, gNBs or other types of wireless access points, each defining a corresponding coverage area 4413*a*, 4413*b*, 4413*c*. Each base station 4412*a*, 4412*b*, 4412*c* is connectable to core network 4414 over a wired or wireless connection 4415. A first UE 4491 located in coverage area 4413*c* is configured to wirelessly connect to, or be paged by, the corresponding base station 4412*c*. A second UE 4492 in coverage area 4413*a* is wirelessly connectable to the corresponding base station 4412*a*. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 16 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 17:
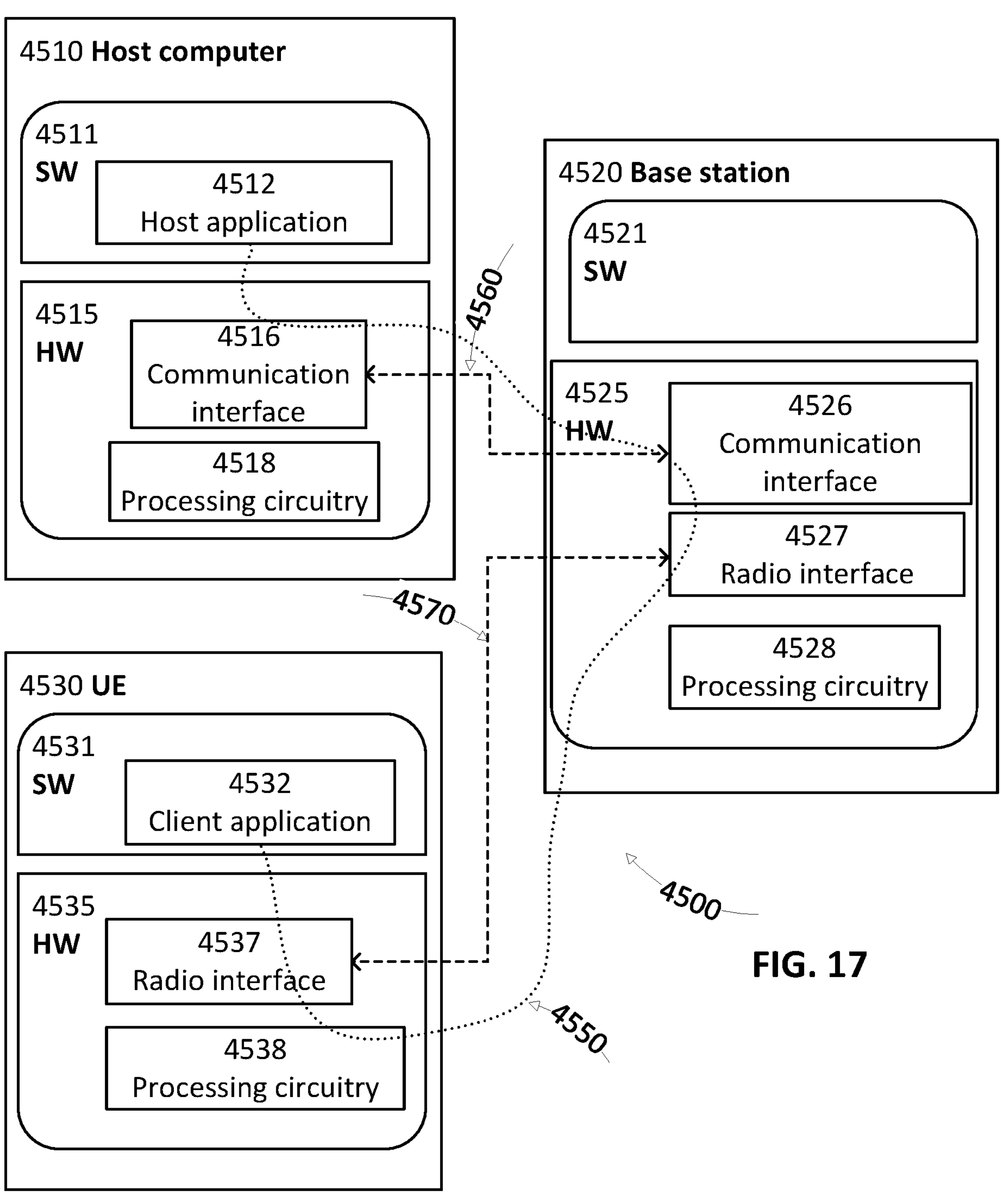
FIG. 17 is a block diagram of a host computer communicating via a base station with a user equipment over a partially wireless connection in accordance with some embodiments.

FIG. 17 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 17. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 17) served by base station 4520. Communication interface 4526 may be configured to facilitate connection 4560 to host computer 4510. Connection 4560 may be direct or it may pass through a core network (not shown in FIG. 17) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 17 may be similar or identical to host computer 4430, one of base stations 4412*a*, 4412*b*, 4412*c* and one of UEs 4491, 4492 of FIG. 16, respectively. This is to say, the inner workings of these entities may be as shown in FIG. 17 and independently, the surrounding network topology may be that of FIG. 16.

In FIG. 17, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 18:
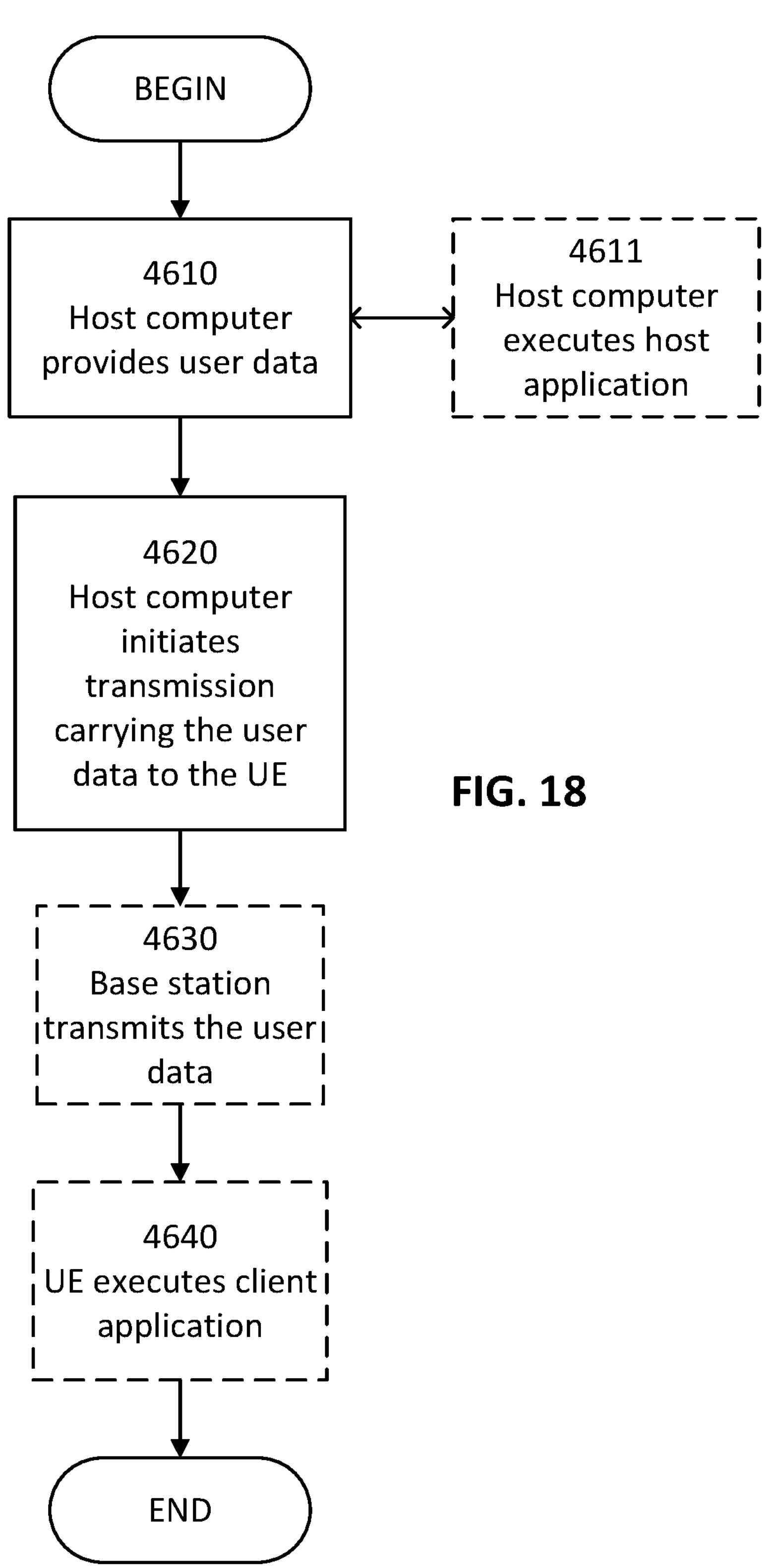
FIG. 18 is a block diagram of methods implemented in a communication system including a host computer, a base station and a user equipment in accordance with some embodiments.

FIG. 18 illustrates methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 19:
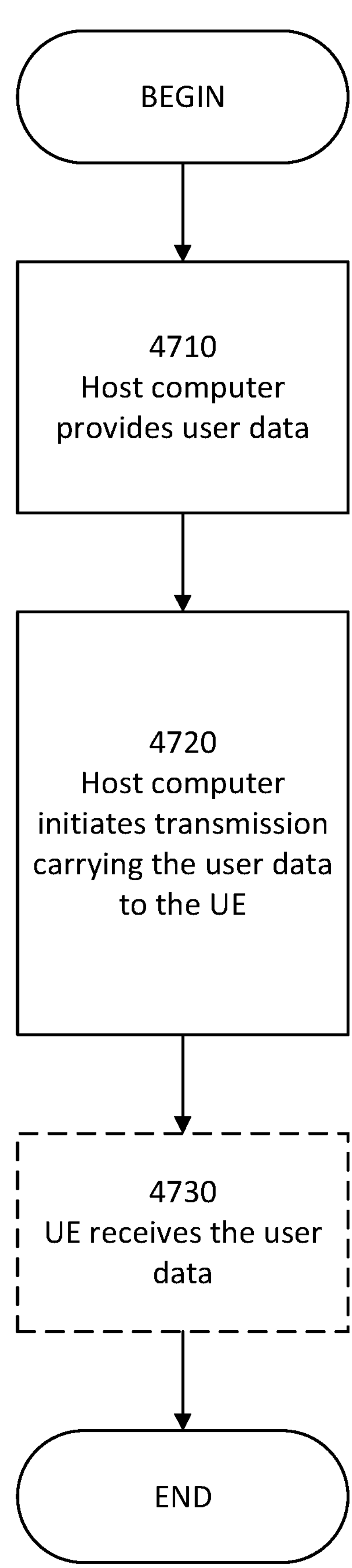
FIG. 19 is a block diagram of methods implemented in a communication system including a host computer, a base station and a user equipment in accordance with some embodiments.

FIG. 19 illustrates methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 20:
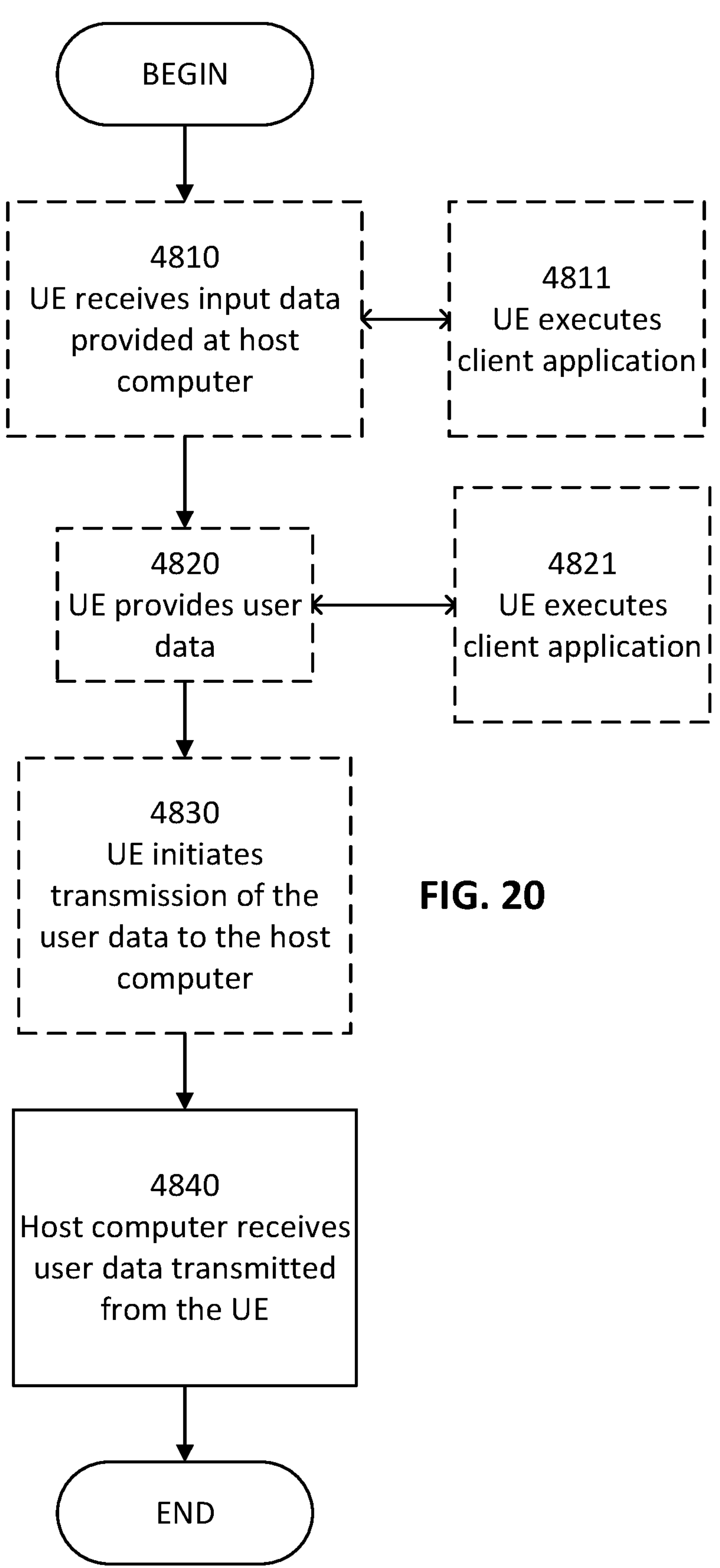
FIG. 20 is a block diagram of methods implemented in a communication system including a host computer, a base station and a user equipment in accordance with some embodiments.

FIG. 20 illustrates methods implemented in a communication system including a host computer, a base station and a user equipment in accordance with some embodiments FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 21:
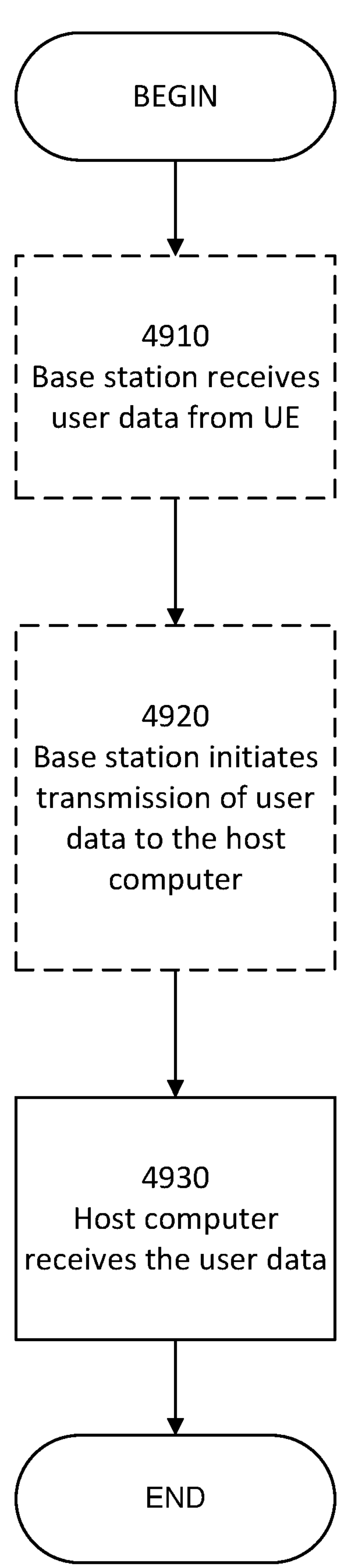
FIG. 21 is a block diagram of methods implemented in a communication system including a host computer, a base station and a user equipment in accordance with some embodiments.

FIG. 21 illustrates methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above description of various embodiments of the present disclosure, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

Example embodiments are discussed below.

Embodiment 1. A method performed by a network node for a telecommunications network for handling interference variations for a communication device is provided. The method comprising: configuring (901) the communication device to measure on a set of resources and to build a machine learning, ML, model to predict a future interference measurement from the set of resources. The method further includes signaling (903) a request to the communication device to provide a prediction of the future interference measurement on the set of resources. The method further includes receiving (905), from the communication device, at least one prediction of future interference on the set of resources. The method further includes changing (907) a network configuration for the communication device based on the received at least one prediction of future interference.

Embodiment 2. The method of Embodiment 1, wherein the changing (907) a network configuration comprises a scheduling, an inter-frequency handover decision, an intra-frequency handover decision, or at least one link-adaptation setting.

Embodiment 3. The method of any of Embodiments 1 to 2, wherein the set of resources comprise a set of resources that are not planned for any traffic in a source cell of the network node.

Embodiment 4. The method of any of Embodiments 1 to 3, wherein the at least one prediction of future interference received from the communication device based on a historical interference measurement comprises historical observations of the communication device of interference values from a specific resource, and wherein the specific resource indicates a signal type or a time-frequency location where the communication device can predict an interference magnitude.

Embodiment 5. The method of Embodiment 4, wherein the specific resource comprises one of a reference signal in a serving network node or a set of resources when there is no traffic or reference signal scheduled in the serving network node.

Embodiment 6. The method of any of Embodiments 1 to 5, wherein the set of resources take into account history information of a communication device or a communication device related configuration.

Embodiment 7. The method of Embodiment 6, wherein the configuration comprises one of the following:

a configuration specific to an area, wherein the area is a region of a serving cell, wherein the serving cell quality is above a certain threshold or the serving cell quality is below a threshold, one or more of a neighboring cell quality is above a threshold, a specific neighboring cell quality is above a threshold, a specific neighboring cell quality is below a threshold, when the UE can hear a specific set of wireless local area network applications, when the UE can hear a specific set of Bluetooth beacons, or when the UE is in a geographical region as bounded by a configured coordinates.

Embodiment 8. The method of any of Embodiments 1 to 7, further comprising signaling (1001) a request to the communication device to provide capabilities of a predicted future interference for a specified time-frequency resource; and receiving (1003), from the communication device, an indication that the communication device is able to use the ML model to learn which signals are from a neighboring network node and from the serving network node, respectively, wherein indication is based on the communication device observing at least one of a reference signal received power, RSRP, measurement, a reference signal received quality, RSRQ, measurement, and a reference signal strength indicator, RSSI, measurement over a time period.

Embodiment 9. The method of any of Embodiments 1 to 8, wherein the configuring (901) comprises a configuration of at least one of the following:

a time-frequency resource for use in predicting the at least one prediction of future interference, indicating to the communication device to build the at least one prediction of future interference using a transmitted reference signal of the communication device, a resource used for a periodic Channel State Information Interference Measurement, CSI-IM, and indicating to the communication device to build the ML model based on historical interference of the communication device with a neighboring network node.

Embodiment 10. The method of any of Embodiments 1 to 9, further comprising configuring (1005) the communication device to report a condition related to the at least one prediction of future interference to the network node.

Embodiment 11. The method of any of Embodiments 1 to 10, wherein the at least one prediction of future interference is based on at least one of a non-reference signal and a reference signal.

Embodiment 12. The method of any of Embodiments 1 to 11, wherein the ML model comprises one of a decision tree, a random forest, a feed forward neural network, an autoregressive model, or a convolutional neural network.

Embodiment 13. A network node (700) in a telecommunications network, the network node comprising at least one processor (703);

at least one memory (705) connected to the at least one processor (703) and storing program code that is executed by the at least one processor to perform operations comprising:

configure the communication device to measure on a set of resources and to build a machine learning, ML, model to predict a future interference measurement from the set of resources;

signal a request to the communication device to provide a prediction of the future interference measurement on the set of resources;

receive, from the communication device, at least one prediction of future interference on the set of resources; and change a network configuration for the communication device based on the received at least one prediction of future interference.

Embodiment 14. The network node (700) of Embodiment 13, wherein the at least one memory (705) connected to the at least one processor (701) and storing program code that is executed by the at least one processor to perform operations according to Embodiments 2 to 12.

Embodiment 15. A network node (700) in a telecommunications network, the network node adapted to perform operations comprising:

configure the communication device to measure on a set of resources and to build a machine learning, ML, model to predict a future interference measurement from the set of resources;

signal a request to the communication device to provide a prediction of the future interference measurement on the set of resources;

receive, from the communication device, at least one prediction of future interference on the set of resources; and change a network configuration for the communication device based on the received at least one prediction of future interference.

Embodiment 16. The network node (700) of Embodiment 15 adapted to perform operations according to any of Embodiments 2 to 12.

Embodiment 17. A computer program comprising program code to be executed by processing circuitry (703) of a network node (700) for a telecommunications network, whereby execution of the program code causes the network node to perform operations comprising:

configure the communication device to measure on a set of resources and to build a machine learning, ML, model to predict a future interference measurement from the set of resources;

signal a request to the communication device to provide a prediction of the future interference measurement on the set of resources;

receive, from the communication device, at least one prediction of future interference on the set of resources; and change a network configuration for the communication device based on the received at least one prediction of future interference.

Embodiment 18. The computer program of Embodiment 17, whereby execution of the program code cause the network node (700) to perform operations according to any of Embodiments 2 to 12.

Embodiment 19. A computer program product comprising a non-transitory storage medium including program code to be executed by processing circuitry (703) of a network node (700) for a telecommunications network, whereby execution of the program code causes the network node to perform operations comprising:

configure the communication device to measure on a set of resources and to build a machine learning, ML, model to predict a future interference measurement from the set of resources;

signal a request to the communication device to provide a prediction of the future interference measurement on the set of resources;

receive, from the communication device, at least one prediction of future interference on the set of resources; and change a network configuration for the communication device based on the received at least one prediction of future interference.

Embodiment 20. The computer program product of Embodiment 19, whereby execution of the program code causes the network node (700) to perform operations according to any of Embodiments 2 to 12.

Embodiment 21. A method performed by a communication device in a telecommunications network for predicting interference variations, the method comprising:

receiving (1101), from a network node, a request to build a machine learning, ML, model of predictions of future interference based on a set of resources;

predicting (1103), at the communication device, at least one prediction of future interference based on a historical interference measurement, wherein the historical interference measurement comprises an indication of the interference experienced by the communication device; and transmitting (1105) the at least one prediction of future interference to the network node.

Embodiment 22. The method of Embodiment 21, wherein the set of resources comprise a set of resources that are not planned for any traffic in a source cell of the network node.

Embodiment 23. The method of any of Embodiments 21 to 22, wherein the at least one prediction of future interference based on a historical interference measurement comprises historical observations of the communication device of interference values from a specific resource, wherein the specific resource indicates a signal type or a time-frequency location where the communication device can predict an interference magnitude.

Embodiment 24. The method of Embodiment 23, wherein the specific resource comprises one of a reference signal in a serving network node or a set of resources when there is no traffic or reference signal scheduled in the serving network node.

Embodiment 25. The method of any of Embodiments 21 to 24, wherein the set of resources take into account history information of the communication device or a configuration related to the communication device.

Embodiment 26. The method of Embodiment 25, wherein the configuration comprises one of the following:

a configuration specific to an area, wherein the area is a region of a serving cell, wherein the serving cell quality is above a certain threshold or the serving cell quality is below a threshold, one or more of a neighboring cell quality is above a threshold, a specific neighboring cell quality is above a threshold, a specific neighboring cell quality is below a threshold, when the UE can hear a specific set of wireless local area network applications, when the UE can hear a specific set of Bluetooth beacons, or when the UE is in a geographical region as bounded by a configured coordinates.

Embodiment 27. The method of any of Embodiments 21 to 26, further comprising:

receiving (1201) a request from the network node to provide capabilities of a predicted future interference for a specified time-frequency resource; and signaling (1203), to the network node, an indication that the communication device is able to use the ML model to learn which signals are from a neighboring network node and from the serving network node, respectively, wherein indication is based on the communication device observing at least one of a reference signal received power, RSRP, measurement, a reference signal received quality, RSRQ, measurement, and a reference signal strength indicator, RSSI, measurement over a time period.

Embodiment 28. The method of any of Embodiments 21 to 27, wherein the communication device measures on the set of resources configured by the network node, wherein the configuration comprises at least one of the following:

a time-frequency resource for use in predicting the at least one prediction of future interference, an indication to the communication device to build the at least one prediction of future interference using a transmitted reference signal of the communication device, a resource used for a periodic Channel State Information Interference Measurement, CSI-IM, and an indication to the communication device to build the ML model based on historical interference of the communication device with a neighboring network node.

Embodiment 29. The method of any of Embodiments 21 to 28, further comprising:

receiving (1205), via the network node, a configuration to report a condition related to the at least one prediction of future interference to the network node.

Embodiment 30. The method of any of Embodiments 21 to 29, wherein the at least one prediction of future interference is based on at least one of a non-reference signal and a reference signal.

Embodiment 31. The method of any of Embodiments 21 to 30, wherein the ML model comprises one of a decision tree, a random forest, a feed forward neural network, an autoregressive model, or a convolutional neural network.

Embodiment 32. A communication device (600) in a telecommunications network, the communication device comprising:

at least one processor (603);

at least one memory (605) connected to the at least one processor (603) and storing program code that is executed by the at least one processor to perform operations comprising:

receive, from a network node, a request to build a machine learning, ML, model of predictions of future interference based on a set of resources;

predict, at the communication device, at least one prediction of future interference based on a historical interference measurement, wherein the historical interference measurement comprises an indication of the interference experienced by the communication device; and transmit the at least one prediction of future interference to the network node.

Embodiment 33. The communication device (600) of Embodiment 32, wherein the at least one memory (605) connected to the at least one processor (603) and storing program code that is executed by the at least one processor to perform operations according to Embodiments 22 to 31.

Embodiment 34. A communication device (600) in a telecommunications network, the communication device adapted to perform operations comprising:

receive, from a network node, a request to build a machine learning, ML, model of predictions of future interference based on a set of resources;

predict, at the communication device, at least one prediction of future interference based on a historical interference measurement, wherein the historical interference measurement comprises an indication of the interference experienced by the communication device; and transmit the at least one prediction of future interference to the network node.

Embodiment 35. The communication device (600) of Embodiment 34 adapted to perform operations according to any of Embodiments 22 to 31.

Embodiment 36. A computer program comprising program code to be executed by processing circuitry (603) of a communication device (600) in a telecommunications network, whereby execution of the program code causes the communication device to perform operations comprising:

receive, from a network node, a request to build a machine learning, ML, model of predictions of future interference based on a set of resources;

predict, at the communication device, at least one prediction of future interference based on a historical interference measurement, wherein the historical interference measurement comprises an indication of the interference experienced by the communication device; and transmit the at least one prediction of future interference to the network node.

Embodiment 37. The computer program of Embodiment 36, whereby execution of the program code cause the communication device (600) to perform operations according to any of Embodiments 22 to 31.

Embodiment 38. A computer program product comprising a non-transitory storage medium including program code to be executed by processing circuitry (603) of a communication device (600) in a telecommunications network, whereby execution of the program code causes the communication device to perform operations comprising:

receive, from a network node, a request to build a machine learning, ML, model of predictions of future interference based on a set of resources;

predict, at the communication device, at least one prediction of future interference based on a historical interference measurement, wherein the historical interference measurement comprises an indication of the interference experienced by the communication device; and transmit the at least one prediction of future interference to the network node.

Embodiment 39. The computer program product of Embodiment 38, whereby execution of the program code causes the communication device (600) to perform operations according to any of Embodiments 22 to 31.

Explanations are provided below for various abbreviations/acronyms used in the present disclosure.

| Abbreviation | Explanation |
|---|---|
| 3GPP | 3rd Generation Partnership Project |
| AI | Artificial Intelligence |
| AR | AutoRegression |
| CA | Carrier Aggregation |
| CAC | Composite available capacity |
| CGI | Cell Global Identifier |
| CU-CP | Centralized unit - control plane |
| CU-UP | Centralized unit - user plane |
| DC | Dual Connectivity |
| DL | Downlink |
| DU | Distributed unit |
| ECID | Enhanced cell identity |
| eNB | Evolved NodeB |
| E-UTRAN | Evolved Universal Terrestrial Radio Access Network |
| gNB | A radio base station in NR. |
| GNSS | Global navigation satellite system |
| LTE | Long term evolution |
| MCG | Master cell group |
| MDT | Minimization of drive test |
| MIMO | Multiple Input Multiple Output |
| ML | Machine Learning |
| MN | Master node |
| NR | New radio |
| O&M | Operation and Maintenance |
| PDCP | Packet data convergence protocol |
| QoE | Quality of Experience |
| QoS | Quality of Service |
| RAN | Radio access network |
| RSRP | Reference signal received power |
| RSRQ | Reference signal received quality |
| SON | Self Optimizing Network |
| SCG | Secondary cell group |
| SINR | Signal to interference and noise ratio |
| SN | Secondary node |
| TNL | Transport network layer |
| UE | User equipment |
| UL | Uplink |
| X2 | The interface between two eNBs. |
| X2AP | X2 Application Protocol |
| Xn | The interface between two gNBs. |
| XnAP | Xn Application Protocol |

ADDITIONAL INFORMATION

The following pages of the present disclosure reproduce text of discussion papers prepared for 3GPP meeting #110-e. This text was included as an appendix to the priority founding application, U.S. Provisional Application No. 63/094,837.

1 INTRODUCTION

As described in RP-201620, the study on AI/ML in RAN3 will focus on the following:

This study item aims to study the functional framework for RAN intelligence enabled by further enhancement of data collection through use cases, examples etc. and identify the potential standardization impacts on current NG-RAN nodes and interfaces.

The detailed objectives of the SI are listed as follows:

Study high level principles for RAN intelligence enabled by AI, the functional framework (e.g. the AI functionality and the input/output of the component for AI enabled optimization) and identify the benefits of AI enabled NG-RAN through possible use cases e.g. energy saving, load balancing, mobility management, coverage optimization, etc.:

1. Study standardization impacts for the identified use cases including: the data that may be needed by an AI function as input and data that may be produced by an AI function as output, which is interpretable for multi-vendor support.

[ . . . ]

One general objective for the work is that the studies should be focused on the current NG-RAN architecture and interfaces to enable AI support for 5G deployments.

In order to explore the areas where AI/ML is most applicable and can improve the network performance for the NG RAN, this paper illustrates use cases that can be taken as reference during the development of AI/ML based solutions.

2 AI/ML BASED USE CASES

It is important to fully utilize the potentials in AI/ML for wireless networks, for example by extracting important data from the system in order to build advanced AI/ML models. One problem in enabling AI/ML for wireless networks is the variable cost depending on wired or over-the-air data transfer. Enabling AI/ML by extending the UE reporting over-the-air by including different types of information, from radio to physical measurements would lead to increased signalling. The trade-off between increased data signalling versus enabling improved intelligence at the network is a challenging problem. It is important to fully address such trade-offs when evaluating different AI/ML use cases in the SI. One alternative to extending the UE report of radio or physical measurements is to explore the use of potential augmented information provided by the UE, for example generated by an AI-model. This information may be given as input to AI models hosted in the network, hence creating a system where AI models interact between each other to produce the desired final output.

Figure 22:
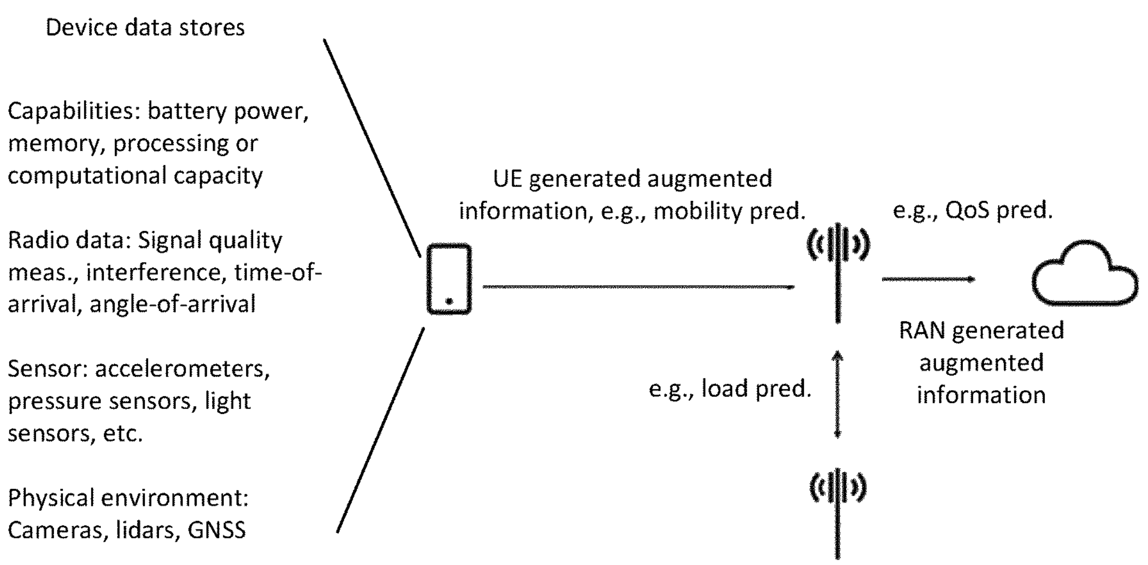
FIG. 22 shows an example of how multiple data sources can be used to create intelligent augmentation data at the UE and at RAN nodes.

FIG. 22 shows an example of how multiple data sources can be used to create intelligent augmentation data at the UE and at RAN nodes.

Proposal 1 Explore Potential Augmented Information from the UE and from the RAN in each Use Case Next, use cases covering important areas where AI/ML is likely to improve network performance is described. The use cases are classified in the following families:

1. AI/ML for traffic steering, both comprising
   Capacity improvements
   Energy efficiency
2. AI/ML for QoS prediction
3. AI/ML for improved radio resource management (RRM)

2.1 AI/ML for Traffic Steering

AI/ML can be applied to steer traffic more efficiently, both in terms of capacity and energy efficiency.

2.1.1 Reward Information for AI/ML-based Handovers

Finding the best cell or set of cells to serve a UE is a challenging task due to the densification of networks and introduction of new frequency bands. One of the challenges in finding the best cell for a UE is to evaluate if the new cell was better than a previous serving cell for the UE, hence, it would be beneficial to have richer feedback information available from the new serving cell, so to compare previous and current serving cell performance.

Figure 23:
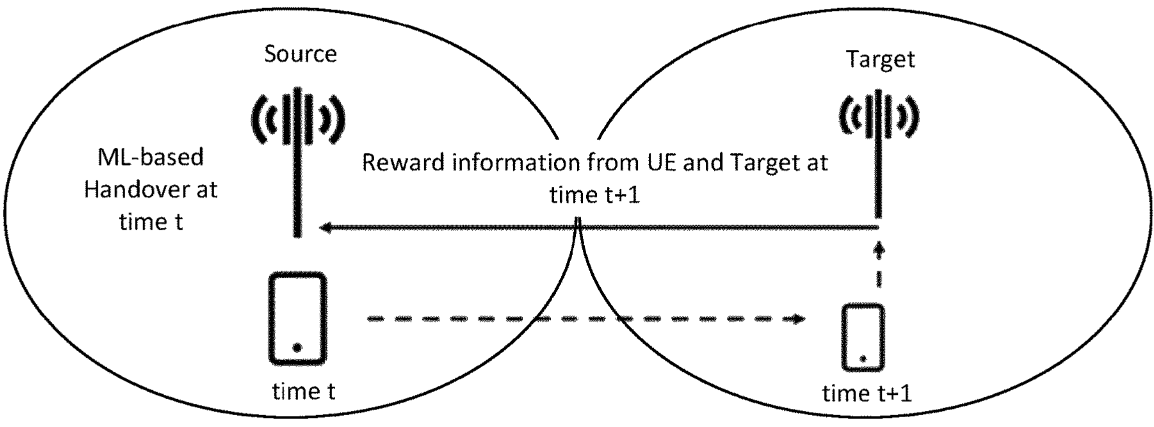
FIG. 23 shows an example of how the target provides reward information (feedback) on the UE performance after handover.

In FIG. 23, the target provides reward information (feedback) on the UE performance after handover. Considering the current handover mechanisms in NR, after a handover to the target cell, the source/serving node would act obliviously about the handed over UE i.e. it would not be interested on that UE any longer. Therefore, if the UE experiences low throughput or poor radio coverage once handed over to the target cell, the source node of the handover would not be able to recognize and take any counteraction preventing such handovers causing poor performance for the UE. It is thus important to design a solution enabling a feedback mechanism after handover, where the UE and the target node provide measurements relative to the performance of the target cell serving the UE. This can enable the source node to update its handover decisions frequently based on the received feedback from target node (which would comprise also feedback from the UE while at target). The feedback from the target could be used as reward information for an AI/ML function that performs handover decisions, one such function could comprise reinforcement learning. Handover decisions consist of a prediction that could take into account possible future performance for a UE once handed over to a certain target cell/node. The feedback provided from target RAN node to source could comprise of:

- Dwelling time in cell
- Measurements of QoS parameters experienced at target (instantaneous/mean)
- UE traffic pattern after handover
- Resource utilizations used by UE, experienced latency (e.g., E2E RTT), measure of transmission reliability
- Radio efficiency at target cell (bit per second per hertz)
- Any change in UEs service requirements
- Mobility history information
- Multi connectivity configurations adopted after HO.

Proposal 2 Investigate Potential Reward Information for Enabling AI/ML Based Traffic Steering 2.1.2 Traffic Steering Augmented Information In addition to the reward information provided by the target RAN node, the potential target RAN node could also signal augmented information as illustrated in the message sequence chart below, generated by an ML-model for improved traffic steering, for example its future load information. The predicted future load information can comprise

- Number of active UEs
- Resource utilization
- Available Capacity
- Number of RRC Connections
- TNL capacity The UE may also provide augmented information such as its predicted mobility pattern and feed this to the target RAN, which in turn will forward it to the source RAN. Similarly, the serving gNB can provide the target gNB with augmented information related to the UE at handover, for example the predicted UE mobility or traffic.

Figure 24:
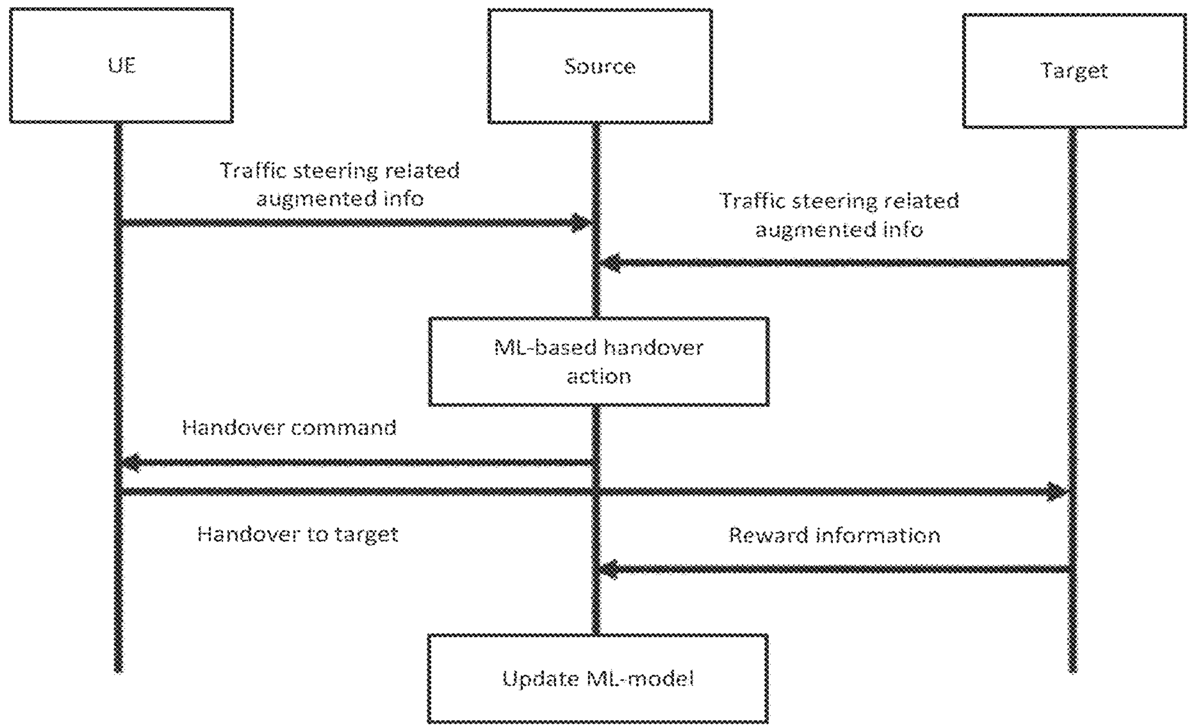
FIG. 24 is a message sequence chart for target cell prediction based on reward information and augmented information.

FIG. 24 is a message sequence chart for target cell prediction based on reward information and augmented information.

Proposal 3 Augmented Information Related to Improved Traffic Steering Should be Investigated 2.1.3 AI/ML for Energy Efficiency Energy efficiency is an important aspect in wireless communications networks. One method for providing energy saving is to put capacity cells into a sleep mode. The activation or deactivation of a capacity cell may be triggered from a gNB that provides basic coverage as illustrated in the picture below and is typically a trade-off between energy efficiency and capacity.

In cases when there is quite low traffic around the capacity cell, it may be more energy efficient to turn off the capacity cell until the load increases. The capacity cell may later be activated when the traffic is higher and when there are UEs in the vicinity of the capacity cell which may be moved into the capacity cell by a handover procedure or some other connectivity reconfiguration procedure. However, it may be quite tricky to find out whether or not the communications UEs served by the basic coverage cell may be served by the capacity cell without activating the capacity cell. This means that in some situations when the load increases, the capacity cell is activated in order to determine whether or not one or more UEs served by the basic coverage cell may be served by the capacity cell. In case no such UEs would connect (or it would connect with acceptable radio conditions) to the activated capacity cell, the activation is done in vain, hence leading to a waste of energy.

Figure 25:
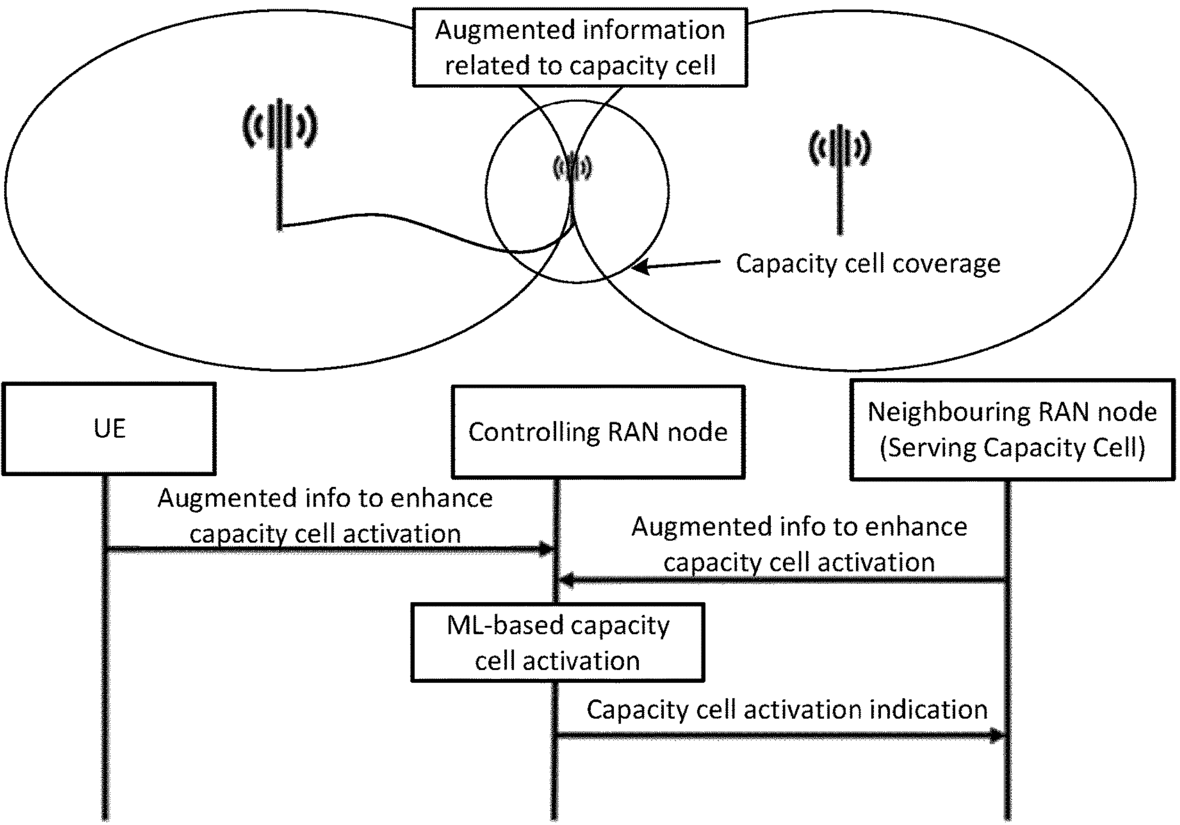
FIG. 25 shows an example of how capacity cell activation is based on reward information and augmented information.

In FIG. 25, capacity cell activation is based on reward information and augmented information.

Furthermore, a capacity cell is often deployed in the handover region of two basic coverage cells, and therefore it is difficult to optimize capacity versus energy consumption. It is important to also look into energy saving application using ML/AI in activating capacity cells efficiently, for example to activate capacity cells based on predictions on traffic that could be offloaded to the capacity cell for all relevant nodes in the network. The signalling of such predictions to the RAN node controlling the activation or the signalling of information that may help to derive a prediction of offloaded traffic to capacity cell, should be investigated. It is also important to investigate whether the UE can provide augmented information to enable a smarter capacity cell activation.

Proposal 4 Energy Efficiency Should be Studied, for Example AI/ML for Capacity Cell Activation 2.2 AI/ML for QoS Prediction Quality of service (QoS) describes the overall performance of a service, for example the latency, reliability or throughput. Service Level Agreements (SLAs) are contractual agreements between an operator and an incumbent for the provisioning of services with a given set of performance requirements. On the basis of the current and predicted QoS target of each served UE, it is possible to determine if SLAs are going to be met. The system in charge for checking fulfillment of SLAs is the OAM. In order to enable better SLA fulfillment prediction at the OAM, one should look into AI/ML in order to provide augmented information helping to forecast SLA fulfilment.

Using AI/ML, the CU-CP can for example predict whether for a group of UEs and services (e.g. for UEs in a certain network slice using a service with 5QI==x) the target QoS requirements will be fulfilled or not. Such prediction can be relative to a specific time window into the future.

Such augmented information can also comprise non-UE specific information, such as a prediction of the expected load per QoS class for a particular time of the day, as well as a prediction of whether QoS requirements for such QoS classes can be fulfilled. The QoS fulfillment prediction could be signalled from the RAN to the OAM upon request from the OAM. The request could also comprise a request for the predicted QoS for a certain type of UE, for example a highly mobile UE or a low-end UE (e.g. IoT).

Figure 26:
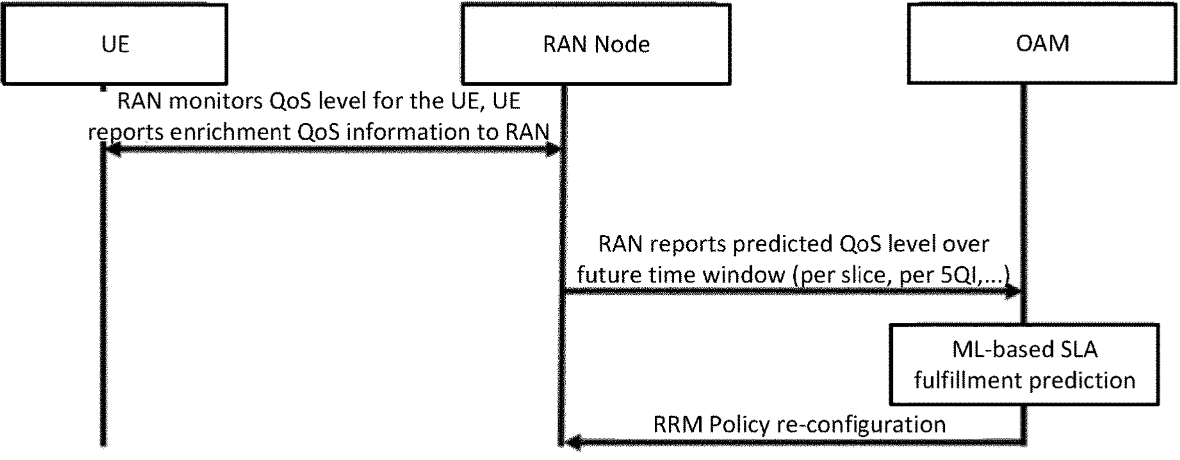
FIG. 26 shows QoS and SLA fulfillment prediction based on enrichment and augmented information.

The OAM receiving such QoS fulfillment prediction can in turn derive whether SLAs can be fulfilled in the future. If for example the OAM determines that SLAs cannot be fulfilled in the future, the OAM can take preventive actions such as to reconfigure resource partition policies per slice at the RAN in order to ensure that the SLAs not fulfilled can be fulfilled by means of a higher amount of resources to be utilized. The general framework is illustrated in the flowchart of FIG. 26, showing QoS and SLA fulfillment prediction based on enrichment and augmented information.

The augmented information sent to the OAM can be used to change the slice configuration, for example allocate more resources if SLA is predicted to not be fulfilled in a future time window.

Proposal 5 AI/ML for Predicting QoS and SLA Fulfilment Should be Studied 2.3 AI/ML for Improved Radio Resource Management (RRM)

The use of AI/ML can provide an improved performance by leveraging new capabilities in learning complex interactions in the environment, one such environment with complex interactions is RRM. Potential RRM algorithms comprise, link-adaptation, rank-selection, power control, mobility decisions. The SI should investigate potential augmented information from UEs or gNBs in order to enable an even better RRM. The augmented information generated by an AI-model could for example comprise forecast values such as the predicted load in a future time frame for one RAN node, or a UE predicted future signal quality value. As an example, the use case of link adaptation can be considered. Link adaptation is a function that needs to react to rather fast changes of radio conditions. A way to improve the performance of link adaptation would be to gain more granular information about the radio environment and to predict the optimal link adaptation configuration on the basis of a prediction of the radio conditions.

In order to enhance link adaptation performance the UE may provide higher granularity data to the serving RAN, such as more granular L1 measurements, measurements of UE speed, UL queuing delays.

At the same time the serving RAN may receive from neighbour nodes information about cross cell interference, e.g. in the form of number of UEs or resource utilisation at cell edge, or indeed information either constituting or helping to extrapolate a prediction of cross cell interference. With such information the serving RAN is able to derive a prediction of the channel condition for the UE and therefore to adopt a better link adaptation configuration.

Proposal 6 Investigate New AI/ML-based Augmented Information for Improved RRM

3 CONCLUSION

In this contribution a description of three main families of use cases has been carried out.

The Use Case families are as follows:

1. AI/ML for traffic steering, both comprising
   Capacity improvements
   Energy efficiency
2. AI/ML for QoS prediction
3. AI/ML for improved radio resource management (RRM)

The following proposals have been derived:

Proposal 1 Proposal 1: Explore potential augmented information from the UE and from the RAN in each use case Proposal 2 Investigate potential reward information for enabling AI/ML based traffic steering Proposal 3 Augmented information related to improved traffic steering should be investigated Proposal 4 Energy efficiency should be studied, for example AI/ML for capacity cell activation Proposal 5 AI/ML for predicting QoS and SLA fulfilment should be studied Proposal 6 Investigate new AI/ML-based augmented information for improved RRM A TP to TR37.816 is presented below, capturing the use case descriptions outlined. Note that the TP also includes the impact on standard per use case, described in R3-20xxxx

4 REFERENCES

1. RP-201281: "Revised WID on enhancement of data collection for SON_MDT in NR and EN-DC", CMCC, Ericsson.

5 TP TO TR 37.817

Start of Changes

5 USE CASES AND SOLUTIONS FOR ARTIFICIAL INTELLIGENCE IN RAN 5.x1 Use case 1: AI/ML for Traffic Steering AI/ML can be applied to steer traffic more efficiently, both in terms of capacity and energy efficiency.

5.x1.1 Reward Information for AI/ML-based Handovers

Finding the best cell or set of cells to serve a UE is a challenging task due to the densification of networks and introduction of new frequency bands. One of the challenges in finding the best cell for a UE is to evaluate if the new cell was better than a previous serving cell for the UE, hence, it would be beneficial to have richer feedback information available from the new serving cell, so to compare previous and current serving cell performance.

In FIG. 23, the target provides reward information (feedback) on the UE performance after handover. Considering the current handover mechanisms in NR, after a handover to the target cell, the source/serving node would act obliviously about the handed over UE i.e. it would not be interested on that UE any longer. Therefore, if the UE experiences low throughput or poor radio coverage once handed over to the target cell, the source node of the handover would not be able to recognize and take any counteraction preventing such handovers causing poor performance for the UE. It is thus important to design a solution enabling a feedback mechanism after handover, where the UE and the target node provide measurements relative to the performance of the target cell serving the UE. This can enable the source node to update its handover decisions frequently based on the received feedback from target node (which would comprise also feedback from the UE while at target). The feedback from the target could be used as reward information for an AI/ML function that performs handover decisions, one such function could comprise reinforcement learning. Handover decisions consist of a prediction that could take into account possible future performance for a UE once handed over to a certain target cell/node. The feedback provided from target RAN node to source could comprise of:

Dwelling time in cell

Measurements of QoS parameters experienced at target (instantaneous/mean)

UE traffic pattern after handover

Resource utilizations used by UE, experienced latency (e.g., E2E RTT), measure of transmission reliability Radio efficiency at target cell (bit per second per hertz)
Any change in UEs service requirements
Mobility history information
Multi connectivity configurations adopted after HO.

5.x1.2 Traffic Steering Augmented Information

In addition to the reward information provided by the target RAN node, the potential target RAN node could also signal augmented information as illustrated in the message sequence chart below, generated by an ML-model f or improved traffic steering, for example its future load information. The predicted future load information can comprise Number of active UEs
Resource utilization
Available Capacity
Number of RRC Connections
TNL capacity The UE may also provide augmented information such as its predicted mobility pattern and feed this to the target RAN, which in turn will forward it to the source RAN. Similarly, the serving gNB can provide the target gNB with augmented information related to the UE at handover, for example the predicted UE mobility or traffic. FIG. 24 is a message sequence chart for target cell prediction based on reward information and augmented information.

5.x1.3 AI/ML for Energy Efficiency

Energy efficiency is an important aspect in wireless communications networks. One method for providing energy saving is to put capacity cells into a sleep mode. The activation or deactivation of a capacity cell may be triggered from a gNB that provides basic coverage as illustrated in the picture below and is typically a trade-off between energy efficiency and capacity.

In cases when there is quite low traffic around the capacity cell, it may be more energy efficient to turn off the capacity cell until the load increases. The capacity cell may later be activated when the traffic is higher and when there are UEs in the vicinity of the capacity cell which may be moved into the capacity cell by a handover procedure or some other connectivity reconfiguration procedure. However, it may be quite tricky to find out whether or not the communications UEs served by the basic coverage cell may be served by the capacity cell without activating the capacity cell. This means that in some situations when the load increases, the capacity cell is activated in order to determine whether or not one or more UEs served by the basic coverage cell may be served by the capacity cell. In case no such UEs would connect (or it would connect with acceptable radio conditions) to the activated capacity cell, the activation is done in vain, hence leading to a waste of energy. In FIG. 25, capacity cell activation is based on reward information and augmented information.

Furthermore, a capacity cell is often deployed in the handover region of two basic coverage cells, and therefore it is difficult to optimize capacity versus energy consumption. It is important to also look into energy saving application using ML/AI in activating capacity cells efficiently, for example to activate capacity cells based on predictions on traffic that could be offloaded to the capacity cell for all relevant nodes in the network. The signalling of such predictions to the RAN node controlling the activation or the signalling of information that may help to derive a prediction of offloaded traffic to capacity cell, should be investigated. It is also important to investigate whether the UE can provide augmented information to enable a smarter capacity cell activation.

5.X1.2 Solutions and Standard Impacts

The Use Case family of "AI/ML for traffic steering" may generate the following standardisation impacts:

Uu Impact:
- Flow of information over Uu from UE to target RAN to derive performance characteristics for the UE after the mobility process
- Flow of information from UE to source RAN to derive prediction of conditions while at the source Xn Impact:
- Signalling from target RAN to source RAN of information relative to the conditions and performance of the UEs after the mobility process took place.
- Signalling from target to source RAN of prediction information allowing to derive potential target cell status, e.g. load predictions per cell 5.x2.1 Use case 2: AI/ML for QoS Prediction Quality of service (QoS) describes the overall performance of a service, for example the latency, reliability or throughput. Service Level Agreements (SLAs) are contractual agreements between an operator and an incumbent for the provisioning of services with a given set of performance requirements. On the basis of the current and predicted QoS target of each served UE, it is possible to determine if SLAs are going to be met. The system in charge for checking fulfillment of SLAs is the OAM. In order to enable better SLA fulfillment prediction at the OAM, one should look into AI/ML in order to provide augmented information helping to forecast SLA fulfilment.

Using AI/ML, the CU-CP can for example predict whether for a group of UEs and services (e.g. for UEs in a certain network slice using a service with 5QI==x) the target QoS requirements will be fulfilled or not. Such prediction can be relative to a specific time window into the future.

Such augmented information can also comprise non-UE specific information, such as a prediction of the expected load per QoS class for a particular time of the day, as well as a prediction of whether QoS requirements for such QoS classes can be fulfilled. The QoS fulfillment prediction could be signalled from the RAN to the OAM upon request from the OAM. The request could also comprise a request for the predicted QoS for a certain type of UE, for example a highly mobile UE or a low-end UE (e.g. IoT).

The OAM receiving such QoS fulfillment prediction can in turn derive whether SLAs can be fulfilled in the future. If for example the OAM determines that SLAs cannot be fulfilled in the future, the OAM can take preventive actions such as to reconfigure resource partition policies per slice at the RAN in order to ensure that the SLAs not fulfilled can be fulfilled by means of a higher amount of resources to be utilized. The general framework is illustrated in the flowchart of FIG. 26, showing QoS and SLA fulfillment prediction based on enrichment and augmented information.

The augmented information sent to the OAM can be used to change the slice configuration, for example allocate more resources if SLA is predicted to not be fulfilled in a future time window.

5.X2.2 Solutions and Standard Impacts

The Use Case family of "AI/ML for QoS monitoring" may generate the following impacts:

F1-C Impacts:
- Signalling from gNB-DU to gNB-CU of augmented information for parameters that may take part in QoS prediction derivation, e.g. Predictions of over the air transmission delays, predictions of packet error rates etc.

RAN-OAM Interface Impact:

- Signalling of predicted QoS levels from RAN to OAM, e.g. per QoS class, per slice
- Based on the QoS level predictions, OAM is able to run predictions on SLA fulfilment. Depending on the SLA fulfilment, OAM signals new policies to RAN influencing how SLAs may be met in the future (e.g. new per slice RRM policies)

5.x3.1 Use Case 3: AI/ML for Improved Radio Resource Management (RRM)

The use of AI/ML can provide an improved performance by leveraging new capabilities in learning complex interactions in the environment, one such environment with complex interactions is RRM. Potential RRM algorithms comprise, link-adaptation, rank-selection, power control, mobility decisions. The SI should investigate potential augmented information from UEs or gNBs in order to enable an even better RRM. The augmented information generated by an AI-model could for example comprise forecast values such as the predicted load in a future time frame for one RAN node, or a UE predicted future signal quality value. As an example, the use case of link adaptation can be considered. Link adaptation is a function that needs to react to rather fast changes of radio conditions. A way to improve the performance of link adaptation would be to gain more granular information about the radio environment and to predict the optimal link adaptation configuration on the basis of a prediction of the radio conditions.

In order to enhance link adaptation performance the UE may provide higher granularity data to the serving RAN, such as more granular L1 measurements, measurements of UE speed, UL queuing delays.

At the same time the serving RAN may receive from neighbour nodes information about cross cell interference, e.g. in the form of number of UEs or resource utilisation at cell edge, or indeed information either constituting or helping to extrapolate a prediction of cross cell interference. With such information the serving RAN is able to derive a prediction of the channel condition for the UE and therefore to adopt a better link adaptation configuration.

5.X3.2 Solutions and Standard Impacts

The Use Case family of "AI/ML for improved radio resource management" may generate the following impacts:

- Uu Impact: Flow of information over Uu from UE to RAN
- F1-C Impact: Signalling of information from gNB-CU to gNB-DU to provide inputs to AI/ML Models assisting with radio resource management policy optimisation
- Xn Impact: Signalling between neighbour nodes of information regarding current or predicted radio conditions, that can serve as input to AI/ML models for prediction of radio resource management policies End of Changes 1. Introduction A new SI has been approved in [1]. As specified in the SID, the study is tasked to address the following objective:

a) Study standardization impacts for the identified use cases including: the data that may be needed by an AI function as input and data that may be produced by an AI function as output, which is interpretable for multi-vendor support.

b) Study standardization impacts on the node or function in current NG-RAN architecture to receive/provide the input/output data.

c) Study standardization impacts on the network interface(s) to convey the input/output data among network nodes or AI functions.

In R3-20xxxx a number of AI/ML use cases were described. The Use Cases could be classified as follows:

1. AI/ML for traffic steering, both comprising
   - Capacity improvements
   - Energy efficiency
2. AI/ML for QoS prediction
3. AI/ML for improved radio resource management (RRM)

This paper addresses the potential Standardisation Impact of the Use Cases analysed.

2 Standardisation Impacts per Use Case Class 2.1 Standardisation Impacts of AI/ML for Traffic Steering—for Capacity and Energy Efficiency This class of Use Cases relies on the ability of the RAN to predict the best cell that will serve the UE. The Use Cases can include mobility scenarios triggered by various reasons (e.g. Energy Efficiency, radio conditions, load conditions) or multi connectivity scenarios (e.g. prediction of best PSCell). In general the use cases provide augmented information about the cell that, given the predicted conditions, will best serve the UE within a future time window.

In this class of Use Cases the main standardisation impacts are foreseen to be on the following:

Uu Impact:

- Flow of information over Uu from UE to target RAN to derive performance characteristics for the UE after the mobility process
- Flow of information from UE to source RAN to derive prediction of conditions while at the source Xn Impact:

- Signalling from target RAN to source RAN of information relative to the conditions and performance of the UEs after the mobility process took place.
- Signalling from target to source RAN of prediction information allowing to derive potential target cell status, e.g. load predictions per cell Conclusion 1: The Use Case family of "AI/ML for traffic steering" may generate the following impacts:

Uu Impact:

- Flow of information over Uu from UE to target RAN to derive performance characteristics for the UE after the mobility process
- Flow of information from UE to source RAN to derive prediction of conditions while at the source Xn Impact:

- Signalling from target RAN to source RAN of information relative to the conditions and performance of the UEs after the mobility process took place.
- Signalling from target to source RAN of prediction information allowing to derive potential target cell status, e.g. load predictions per cell 2.2 Standardisation Impacts of AI/ML for QoS Prediction This class of Use Cases relies on the interaction between the RAN and the OAM system. In this class of Use Cases the RAN provides augmented information to the OAM concerning predictions of QoS levels.

Such QoS level predictions may consist of predictions of one or more QoS parameters forming the QoS profile of each bearer at a UE. While it might be considered that predictions could be derived on a per UE per bearer basis, it appears that the amount of information and predictions generated in this case may be overwhelming, as well as the computational effort to derive such number of predications. Instead, an equally effective approach with a lower burden on processing and storage could be that of deriving QoS predictions on a per QoS class basis. For example, QoS prediction could be derived on a per slice and per 5QI granularity.

In this class of Use Cases the main standardisation impacts are foreseen to be on the following:

- F1-C Impacts:
  - Signalling from gNB-DU to gNB-CU of augmented information for parameters that may take part in QoS prediction derivation, e.g. Predictions of over the air transmission delays, predictions of packet error rates etc.
- RAN-OAM Interface Impact:
  - Signalling of predicted QoS levels from RAN to OAM, e.g. per QoS class, per slice
  - Based on the QoS level predictions, OAM is able to run predictions on SLA fulfilment. Depending on the SLA fulfilment, OAM signals new policies to RAN influencing how SLAs may be met in the future (e.g. new per slice RRM policies)

Conclusion 2: The Use Case family of "Standardisation Impacts of AI/ML for QoS monitoring" may generate the following impacts:

- F1-C Impacts:
  - Signalling from gNB-DU to gNB-CU of augmented information for parameters that may take part in QoS prediction derivation, e.g. Predictions of over the air transmission delays, predictions of packet error rates etc.
- RAN-OAM Interface Impact:
  - Signalling of predicted QoS levels from RAN to OAM, e.g. per QoS class, per slice
  - Based on the QoS level predictions, OAM is able to run predictions on SLA fulfilment. Depending on the SLA fulfilment, OAM signals new policies to RAN influencing how SLAs may be met in the future (e.g. new per slice RRM policies)

2.3 Standardisation Impacts of AI/ML for Improved Radio Resource Management

In this class of scenarios it is possible to group all scenarios based on AI/ML model hosting at the RAN, so to allow for optimisation of RRM processes via a fast control loop. The output of the AI/ML models in this family are prediction parameters that can be used when applying radio resource management. An example of such input could be a prediction of link adaptation configurations. The RAN has today a very rich set of information that allow for good configuration of radio resource policies. However, there are information currently missing at the RAN, especially concerning the "view" UEs have of the surrounding conditions.

In this class of Use Cases the main standardisation impacts are foreseen to be on the following:

- Uu Impact: Flow of information over Uu from UE to RAN
- F1-C Impact: Signalling of information from gNB-CU to gNB-DU to provide inputs to AI/ML Models assisting with radio resource management policy optimisation
- Xn Impact: Signalling between neighbour nodes of information regarding current or predicted radio conditions, that can serve as input to AI/ML models for prediction of radio resource management policies Conclusion 3: The Use Case family of "AI/ML for improved radio resource management" may generate the following impacts:

- Uu Impact: Flow of information over Uu from UE to RAN
- F1-C Impact: Signalling of information from gNB-CU to gNB-DU to provide inputs to AI/ML Models assisting with radio resource management policy optimisation
- Xn Impact: Signalling between neighbour nodes of information regarding current or predicted radio conditions, that can serve as input to AI/ML models for prediction of radio resource management policies 3 Conclusion This paper has analysed the potential impacts on the standard derived from the Use Cases analysed in R3-2xxxx. The following conclusions were derived:

Conclusion 1: The Use Case family of "AI/ML for efficient traffic steering" may generate the following impacts:

- Uu Impact:
  - Flow of information over Uu from UE to target RAN to derive performance characteristics for the UE after the mobility process
  - Flow of information from UE to source RAN to derive prediction of conditions while at the source
- Xn Impact:
  - Signalling from target RAN to source RAN of information relative to the conditions and performance of the UEs after the mobility process took place.
  - Signalling from target to source RAN of prediction information allowing to derive potential target cell status, e.g. load predictions per cell Conclusion 2: The Use Case family of "Standardisation Impacts of AI/ML for QoS monitoring" may generate the following impacts:

- F1-C Impacts:
  - Signalling from gNB-DU to gNB-CU of augmented information for parameters that may take part in QoS prediction derivation, e.g. Predictions of over the air transmission delays, predictions of packet error rates etc.
- RAN-OAM Interface Impact:
  - Signalling of predicted QoS levels from RAN to OAM, e.g. per QoS class, per slice
  - Based on the QoS level predictions, OAM is able to run predictions on SLA fulfilment. Depending on the SLA fulfilment, OAM signals new policies to RAN influencing how SLAs may be met in the future (e.g. new per slice RRM policies)

Conclusion 3: The Use Case family of "AI/ML for improved radio resource management" may generate the following impacts:

- Uu Impact: Flow of information over Uu from UE to RAN
- F1-C Impact: Signalling of information from gNB-CU to gNB-DU to provide inputs to AI/ML Models assisting with radio resource management policy optimisation
- Xn Impact: Signalling between neighbour nodes of information regarding current or predicted radio conditions, that can serve as input to AI/ML models for prediction of radio resource management policies It is proposed to capture the impacts on the standard for the use cases outlined above in the RAN3 TR 37.817. A TP including such impacts has been provided in R3-20xxxx.

4 References

[1]. RP-201620: "Enhancement for data collection for NR and ENDC".

The invention claimed is:

1. A method performed by a network node for a telecommunications network for handling interference variations for a communication device, the method comprising:

configuring the communication device to measure on a set of resources and to build a machine learning (ML) model to predict a future interference measurement from the set of resources;

signaling a request to the communication device to provide a prediction of the future interference measurement on the set of resources;

receiving, from the communication device, at least one prediction of future interference on the set of resources; and changing a network configuration for the communication device based on the received at least one prediction of future interference.

2. The method of claim 1, wherein the changing a network configuration for the communication device comprises a scheduling, an inter-frequency handover decision, an intra-frequency handover decision, or at least one link-adaptation setting.

3. The method of claim 1, wherein the set of resources comprise a set of resources that are not planned for any traffic in a source cell of the network node.

4. The method of claim 1, wherein the at least one prediction of future interference received from the communication device based on a historical interference measurement comprises historical observations of the communication device of interference values from a specific resource, wherein the specific resource indicates a signal type and/or a time-frequency location where the communication device can predict an interference magnitude.

5. The method of claim 4, wherein the specific resource comprises one of a reference signal in a serving network node or a set of resources when there is no traffic or reference signal scheduled in the serving network node.

6. The method of claim 1, wherein the set of resources take into account history information of a communication device or a communication device related configuration.

7. The method of claim 6, wherein the configuration comprises one of the following:

a configuration specific to an area, wherein the area is a region of a serving cell, wherein the serving cell quality is above a certain threshold, or the serving cell quality is below a threshold, or one or more of a neighboring cell quality is above a threshold, or a specific neighboring cell quality is above a threshold, or a specific neighboring cell quality is below a threshold, or when the UE can hear a specific set of wireless local area network applications, or when the UE can hear a specific set of Bluetooth beacons, or when the UE is in a geographical region as bounded by a configured coordinates.

8. The method of claim 1, further comprising:

signaling a request to the communication device to provide capabilities of a predicted future interference for a specified time-frequency resource; and receiving, from the communication device, an indication that the communication device is able to use the ML model to learn which signals are from a neighboring network node and from the serving network node, respectively, wherein indication is based on the communication device observing at least one of a reference signal received power (RSRP) measurement, a reference signal received quality (RSRQ) measurement, and a reference signal strength indicator (RSSI) measurement over a time period.

9. The method of claim 1, wherein the configuring comprises a configuration of at least one of the following:

a time-frequency resource for use in predicting the at least one prediction of future interference, indicating to the communication device to build the at least one prediction of future interference using a transmitted reference signal of the communication device, a resource used for a periodic Channel State Information Interference Measurement (CSI-IM), and indicating to the communication device to build the ML model based on historical interference of the communication device with a neighboring network node.

10. The method of claim 1, further comprising:

configuring the communication device to report a condition related to the at least one prediction of future interference to the network node.

11. The method of claim 1, wherein the at least one prediction of future interference is based on at least one of a non-reference signal and a reference signal.

12. The method of claim 1, wherein the ML model comprises one of a decision tree, a random forest, a feed forward neural network, an autoregressive model, or a convolutional neural network.

* * * * *